(12) United States Patent
Spitzer

(10) Patent No.: US 6,204,974 B1
(45) Date of Patent: Mar. 20, 2001

(54) COMPACT IMAGE DISPLAY SYSTEM FOR EYEGLASSES OR OTHER HEAD-BORNE FRAMES

(75) Inventor: Mark B. Spitzer, Sharon, MA (US)

(73) Assignee: The Microoptical Corporation, Westwood, MA (US)

(*) Notice: Subject to any disclaimer, the term of this patent is extended or adjusted under 35 U.S.C. 154(b) by 0 days.

(21) Appl. No.: 09/271,597

(22) Filed: Mar. 17, 1999

Related U.S. Application Data

(63) Continuation-in-part of application No. 08/844,098, filed on Apr. 18, 1997, now Pat. No. 5,886,822, and a continuation-in-part of application No. 09/170,887, filed on Oct. 14, 1998, now Pat. No. 6,023,372.
(60) Provisional application No. 60/027,998, filed on Oct. 8, 1996, and provisional application No. 60/064,430, filed on Oct. 30, 1997.

(51) Int. Cl.[7] .................................................. G02B 27/14
(52) U.S. Cl. ............................................ 359/630; 359/633
(58) Field of Search ..................................... 359/630, 631, 359/633, 638; 345/7, 8

(56) References Cited

U.S. PATENT DOCUMENTS

| | | | |
|---|---|---|---|
| Re. 28,847 | 6/1976 | Vizenor | 350/302 |
| D. 195,365 | 6/1963 | Holt | D57/1 |
| 3,192,826 | 7/1965 | Papke | 88/1.5 |
| 3,216,308 | 11/1965 | Northcutt | 88/1 |
| 3,229,580 | 1/1966 | Mitchell | 88/86 |
| 3,524,710 | 8/1970 | Rickert | 356/251 |
| 3,610,825 | 10/1971 | Fritzel | 178/7.8 |
| 3,787,109 | 1/1974 | Vizenor | 350/302 |
| 3,885,095 | 5/1975 | Wolfson et al. | 178/7.88 |
| 3,915,548 | 10/1975 | Opittek et al. | 350/3.5 |
| 3,923,370 | 12/1975 | Mostrom | 350/55 |
| 3,936,605 | 2/1976 | Upton | 179/1 SP |
| 3,940,204 | 2/1976 | Withrington | 350/3.5 |
| 4,052,073 | 10/1977 | Miller | 273/148 R |
| 4,082,432 | 4/1978 | Kirschner | 350/174 |
| 4,195,915 | 4/1980 | Lichty et al. | 350/345 |

(List continued on next page.)

FOREIGN PATENT DOCUMENTS

| | | | |
|---|---|---|---|
| 22 05 325 C2 | 4/1973 | (DE) | 356/251 |
| 301672 | 12/1928 | (GB) | 350/286 |

OTHER PUBLICATIONS

*Real–Time American Sign Language Recognition: Using Desk and Wearable Computer Based Video,* Thad Starner et al., Perpetual Computing TR#466, MIT Media Lab., to appear IEEE PAMI'98, Arp. 26, 1996.

'WearCam' (*The Wearable Camera*): *Personal Imaging Systems for long–term use in wearable tetherless computer-–mediated reality and personal Photo/Videographic Memory Prosthesis,* Steve Mann, Digest of Papers of the Second International Symposium on Wearable Computers, Oct. 19–20, 1998, Pittsburgh, PA, pp. 124–131, sponsored by IEEE Computer Society Task Force on Wearable Information Systems.

(List continued on next page.)

Primary Examiner—Ricky Mack
(74) Attorney, Agent, or Firm—Weingarten, Schurgin, Gagnebin & Hayes LLP

(57) ABSTRACT

A head-mountable image display system provides an image to a user's eye separate from ambient light. The system includes an optical relay having an optical pathway to receive light from a display element. The optical relay also permits passage of ambient light toward the user's eye. An eyepiece assembly is disposed to redirect light on the optical pathway to the user's eye. The system is highly compact, allowing the integration of the display system with eyeglasses, a face mask, such as a diver's mask, a head set, or the like.

55 Claims, 21 Drawing Sheets

U.S. PATENT DOCUMENTS

| | | | |
|---|---|---|---|
| 4,218,111 | 8/1980 | Withrington et al. | 350/3.72 |
| 4,447,128 | 5/1984 | Ferrer | 350/174 |
| 4,550,984 | 11/1985 | Reymond | 350/404 |
| 4,649,434 | 3/1987 | Weinblatt | 358/250 |
| 4,664,475 | 5/1987 | Ferrer | 350/174 |
| 4,665,385 | 5/1987 | Henderson | 340/539 |
| 4,722,601 | 2/1988 | McFarlane | 356/152 |
| 4,751,691 | 6/1988 | Perera | 368/10 |
| 4,753,514 | 6/1988 | Kubik | 350/174 |
| 4,799,765 | 1/1989 | Ferrer | 350/174 |
| 4,806,001 | 2/1989 | Okabe et al. | 350/432 |
| 4,806,011 | 2/1989 | Bettinger | 351/158 |
| 4,818,048 | 4/1989 | Moss | 350/3.7 |
| 4,826,287 | 5/1989 | Cook et al. | 350/174 |
| 4,852,988 | 8/1989 | Velez et al. | 351/210 |
| 4,853,306 | 8/1989 | Wreede et al. | 430/1 |
| 4,867,551 | 9/1989 | Perera | 351/158 |
| 4,869,575 | 9/1989 | Kubik | 359/630 |
| 4,902,083 | 2/1990 | Wells | 350/6.6 |
| 4,934,773 | 6/1990 | Becker | 350/6.6 |
| 4,961,626 * | 10/1990 | Fournier, Jr. et al. | |
| 4,968,117 | 11/1990 | Chern et al. | 350/162.24 |
| 4,973,132 | 11/1990 | McDonald et al. | 350/174 |
| 4,973,139 | 11/1990 | Weinhrauch et al. | 350/345 |
| 5,003,300 | 3/1991 | Wells | 340/705 |
| 5,013,134 | 5/1991 | Smith | 350/174 |
| 5,028,119 | 7/1991 | Hegg et al. | 350/174 |
| 5,044,709 | 9/1991 | Smith et al. | 359/13 |
| 5,050,962 | 9/1991 | Monnier et al. | 359/13 |
| 5,053,755 | 10/1991 | Smith et al. | 340/705 |
| 5,129,716 | 7/1992 | Holakovszky et al. | 351/50 |
| 5,138,470 | 8/1992 | Moss et al. | 359/13 |
| 5,162,828 | 11/1992 | Furness et al. | 353/122 |
| 5,184,250 | 2/1993 | Lacroix | 359/631 |
| 5,212,471 | 5/1993 | McDonald | 340/705 |
| 5,214,425 | 5/1993 | Wreede | 340/980 |
| 5,231,379 | 7/1993 | Wood et al. | 340/705 |
| 5,281,957 | 1/1994 | Schoolman | 345/8 |
| 5,281,960 | 1/1994 | Dwyer, III | 345/31 |
| 5,309,169 | 5/1994 | Lippert | 345/8 |
| 5,320,538 | 6/1994 | Baum | 434/307 |
| 5,325,386 | 6/1994 | Jewell et al. | 372/50 |
| 5,334,991 | 8/1994 | Well et al. | 345/8 |
| 5,348,477 | 9/1994 | Welch et al. | 434/43 |
| 5,359,669 | 10/1994 | Shanley et al. | 382/6 |
| 5,367,345 | 11/1994 | DaSilva | 351/123 |
| 5,369,415 | 11/1994 | Richard et al. | 345/6 |
| 5,381,267 | 1/1995 | Woody | 359/632 |
| 5,384,654 | 1/1995 | Iba | 359/364 |
| 5,392,158 | 2/1995 | Tosaki | 359/633 |
| 5,416,876 | 5/1995 | Ansley et al. | 385/116 |
| 5,446,507 | 8/1995 | Chang | 351/158 |
| 5,455,591 | 10/1995 | Hui | 342/185 |
| 5,459,612 | 10/1995 | Ingleton | 359/630 |
| 5,469,185 | 11/1995 | Lebby et al. | 345/8 |
| 5,491,510 | 2/1996 | Gove | 348/77 |
| 5,506,728 | 4/1996 | Edwards et al. | 359/629 |
| 5,519,410 | 5/1996 | Smalanskas et al. | 345/7 |
| 5,537,253 | 7/1996 | Cox et al. | 359/630 |
| 5,539,578 | 7/1996 | Togino et al. | 359/630 |
| 5,576,887 | 11/1996 | Ferrin et al. | 359/631 |
| 5,579,148 | 11/1996 | Nishikawa et al. | 359/214 |
| 5,583,590 | 12/1996 | Clupper | 351/200 |
| 5,585,871 | 12/1996 | Linden | 351/158 |
| 5,589,846 | 12/1996 | Kobayashi | 345/8 |
| 5,596,451 | 1/1997 | Handschy et al. | 359/633 |
| 5,606,743 | 2/1997 | Vogt et al. | 455/347 |
| 5,610,765 | 3/1997 | Colucci | 359/633 |
| 5,626,410 | 5/1997 | Chambers et al. | 353/94 |
| 5,629,790 | 5/1997 | Neukermans et al. | 359/198 |
| 5,648,789 | 7/1997 | Beadles et al. | 345/8 |
| 5,653,751 | 8/1997 | Samiy et al. | 623/4 |
| 5,654,827 | 8/1997 | Reichert | 359/631 |
| 5,654,828 | 8/1997 | Togino et al. | 359/633 |
| 5,671,037 | 9/1997 | Ogasawara et al. | 351/158 |
| 5,673,139 | 9/1997 | Johnson | 359/291 |
| 5,682,173 | 10/1997 | Holakovsky et al. | 345/8 |
| 5,699,194 | 12/1997 | Takahashi | 359/633 |
| 5,712,649 | 1/1998 | Tosaki | 345/8 |
| 5,717,479 | 2/1998 | Rickards | 351/158 |
| 5,719,588 | 2/1998 | Johnson | 345/8 |
| 5,744,788 | 4/1998 | Metlitsky et al. | 235/454 |
| 5,751,493 | 5/1998 | Hur | 359/630 |
| 5,808,589 | 9/1998 | Fergason | 345/8 |
| 5,815,326 | 9/1998 | Takahashi | 359/729 |
| 5,943,171 | 8/1999 | Budd et al. | 359/631 |
| 5,973,845 | 10/1999 | Hilderbrand et al. | 359/630 |
| 5,991,103 | 11/1999 | Togino | 359/834 |
| 6,023,372 | 2/2000 | Spitzer et al. | 359/630 |
| 6,081,304 | 6/2000 | Kuriyama et al. | 348/838 |
| 6,091,546 | 7/2000 | Spitzer | 359/618 |

OTHER PUBLICATIONS

Video I/O interface for wearable computers, M.B. Spitzer et al., Proceedings of SPIE Conference 3689, Helmet and Head–Mounted Displays IV, Orlando Florida, Apr. 5 and 6, 1999.

Mission Impossible: Video Glasses and Sunglasses, The Absolute Ultimate In Covert Video Surveillance, http://www.pimall.com/nais/e.vsunglass.html, Oct. 27, 1998, pp. 1–4.

Steve Ditlea, "Inside Big Blue", *Popular Mechanics*, Dec. 1998,.pp. 54–59.

Ferrin, Frank J., "An update on optical systems for military head mounted displays", presented at SPIE's "AeroSense", Apr. 5–9, 1999, 8 pages.

Rotier, Donald J., "Optical Approaches to the Helmet Mounted Display", SPIE vol. 1116 Helmut Mounted Displays (1989), pp. 14–18.

Albacomp Computers Corp., "Personal Monitor" brochure (1997).

* cited by examiner

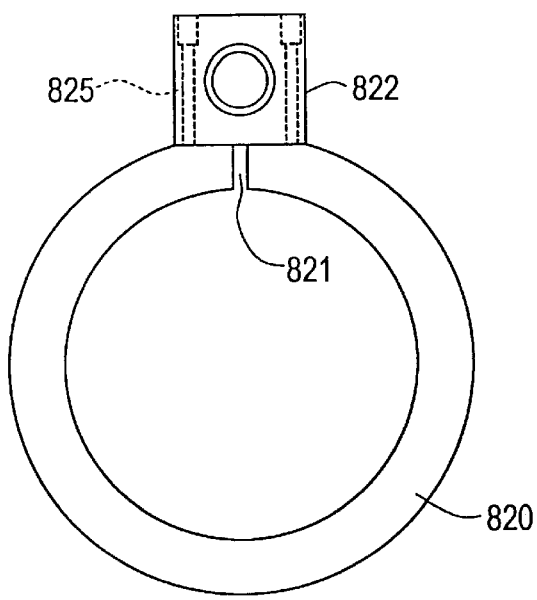
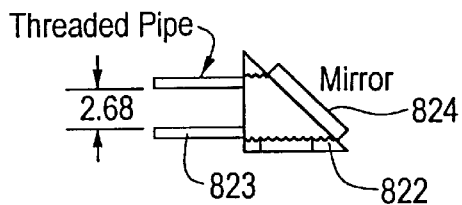
FIG. 5A
FIG. 5B
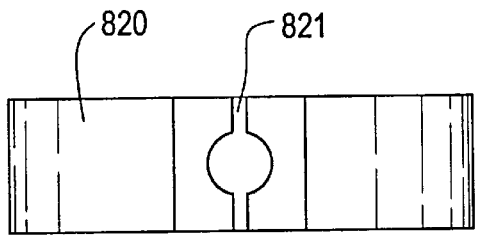
FIG. 5C
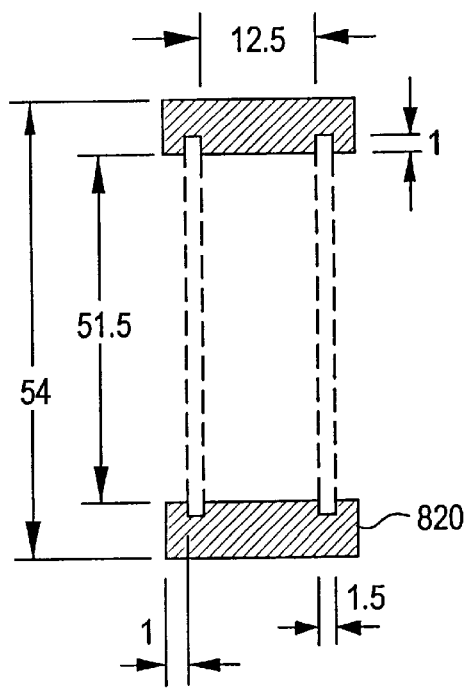
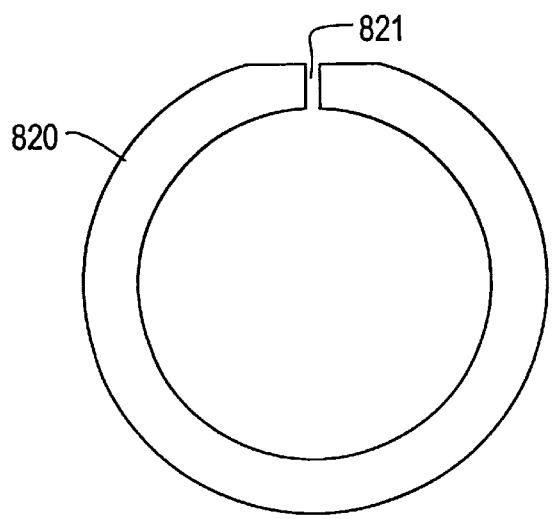
FIG. 5D
FIG. 5E

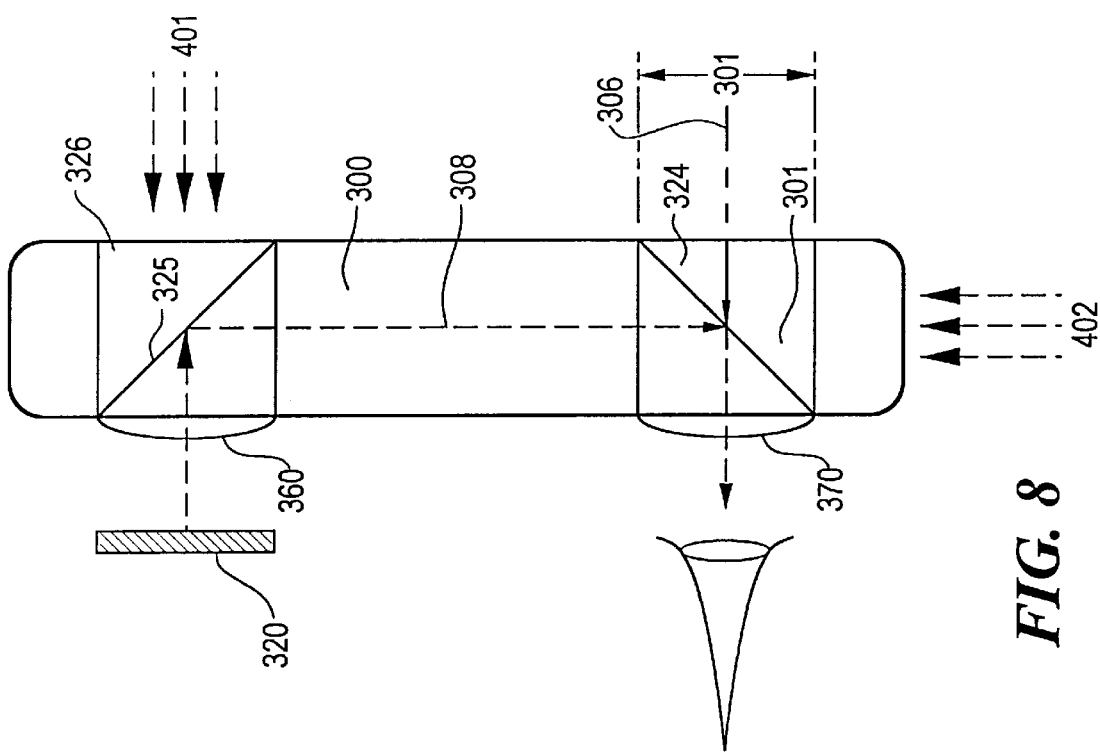
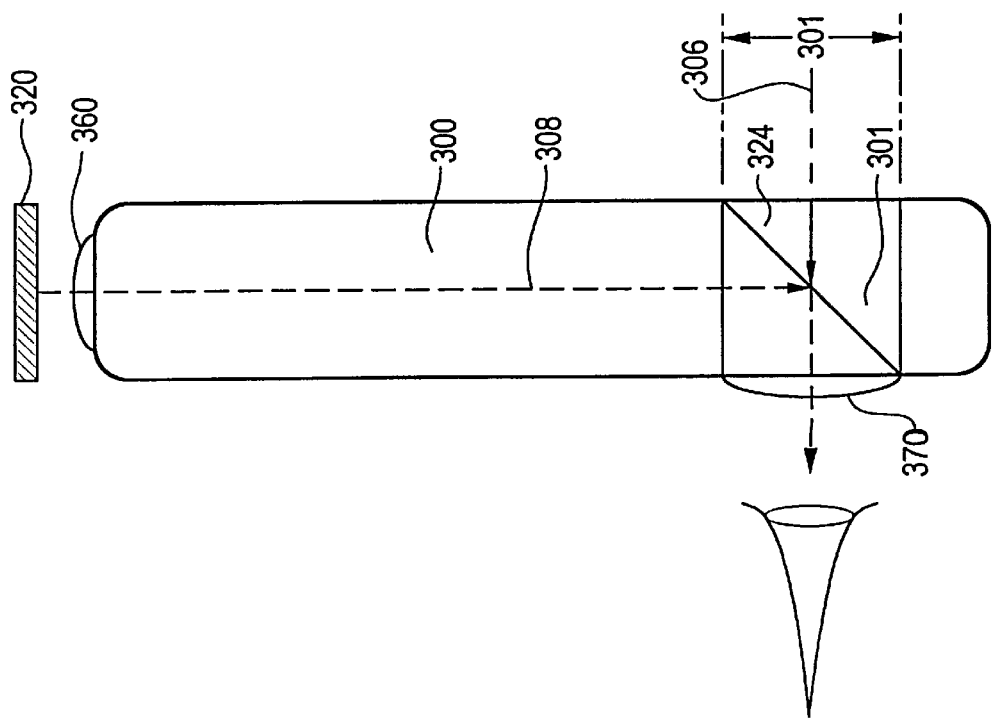
FIG. 8
FIG. 7

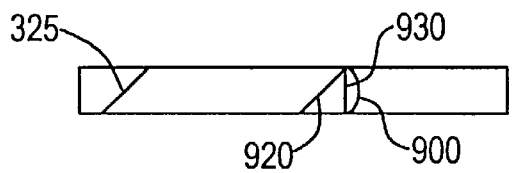
FIG. 14A
CROSS SECTION OF LENS
THROUGH A-A
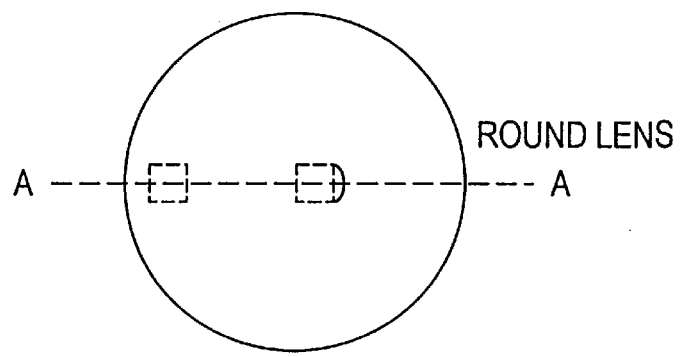
FIG. 14B — ROUND LENS
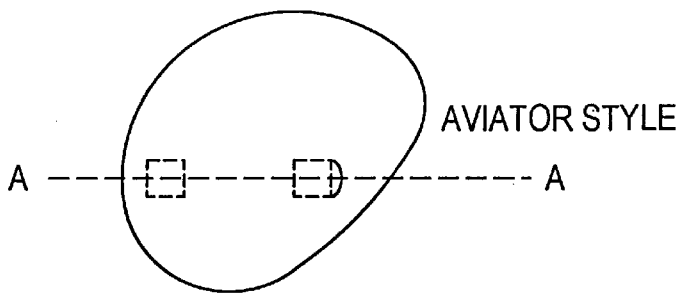
FIG. 14C — AVIATOR STYLE
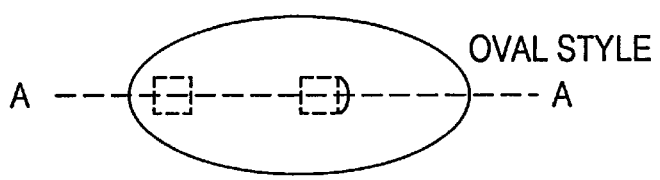
FIG. 14D — OVAL STYLE
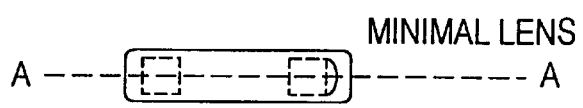
FIG. 14E — MINIMAL LENS

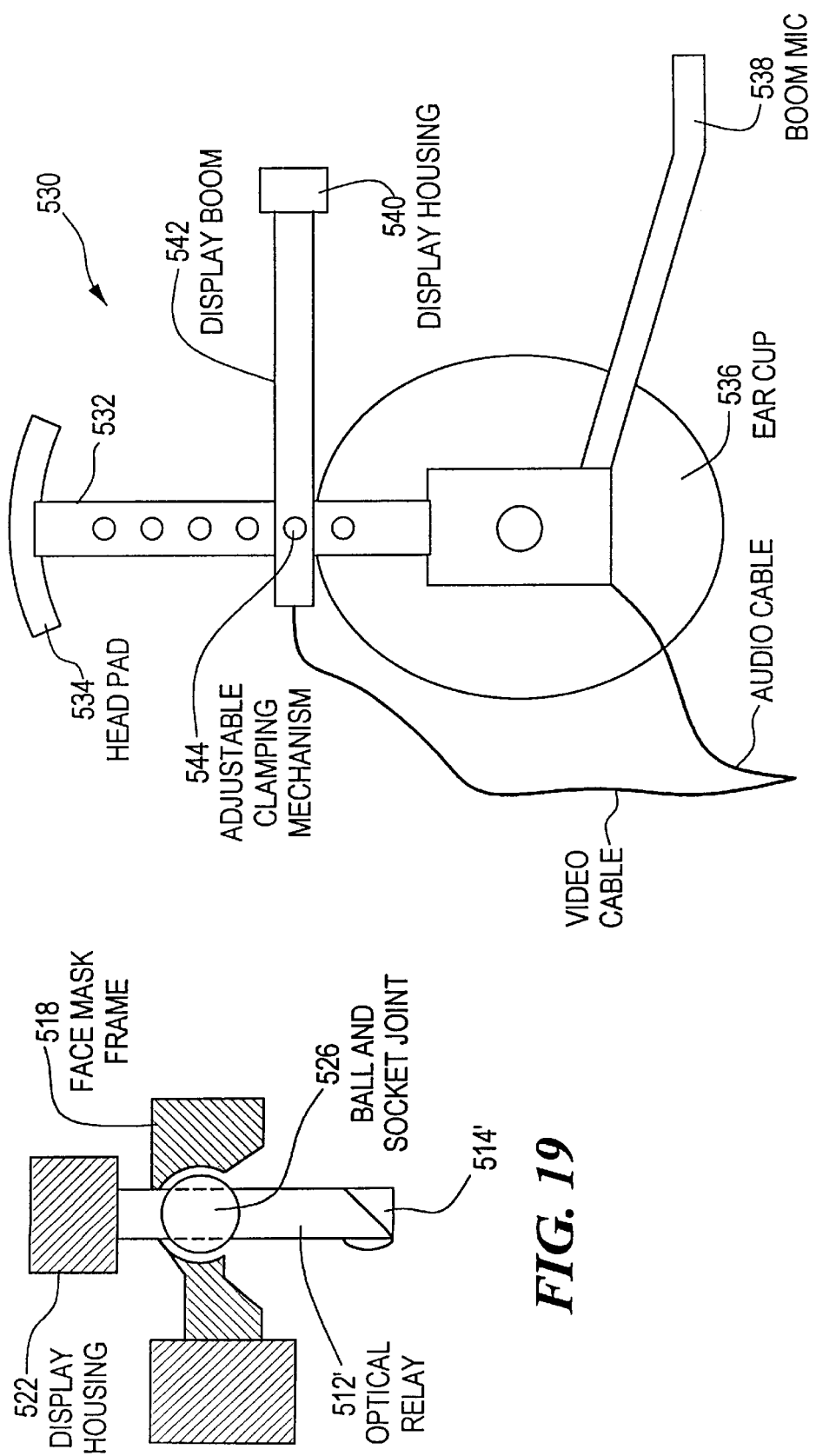

SIDE VIEW

TOP VIEW

ALTERNATE LIGHT WEIGHT CONSTRUCTION

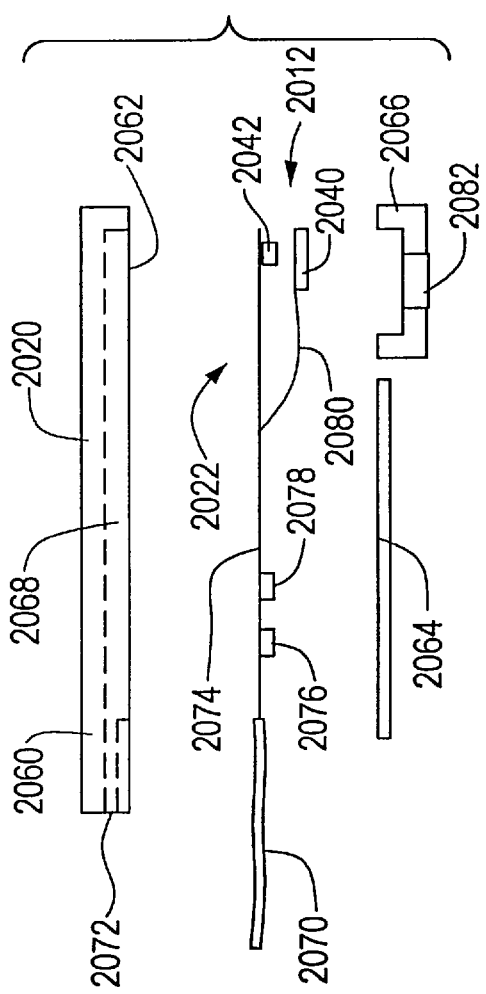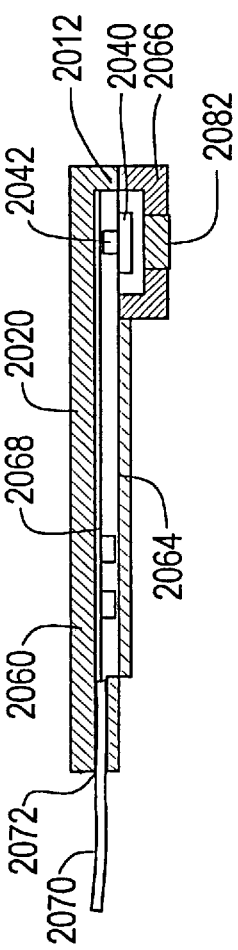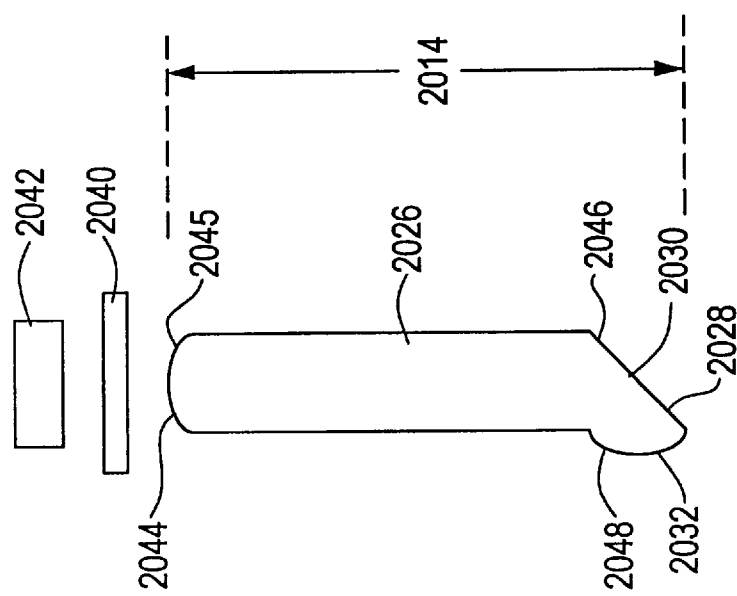

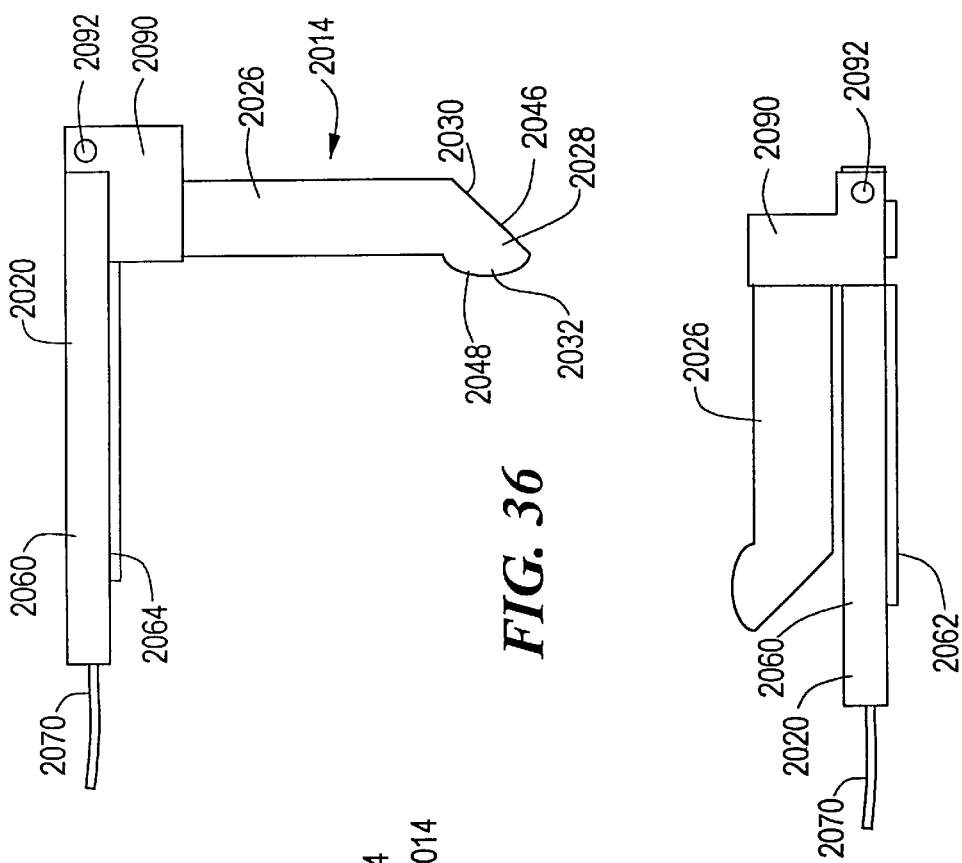
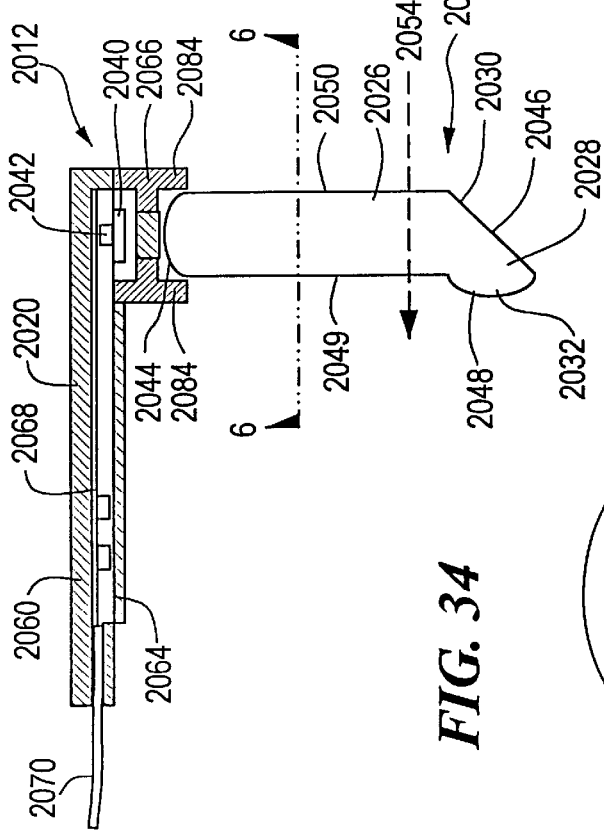
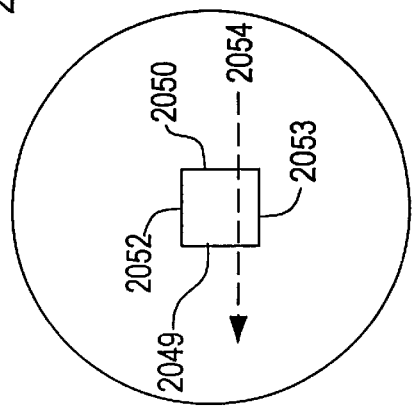
FIG. 36
FIG. 37
FIG. 34
FIG. 35

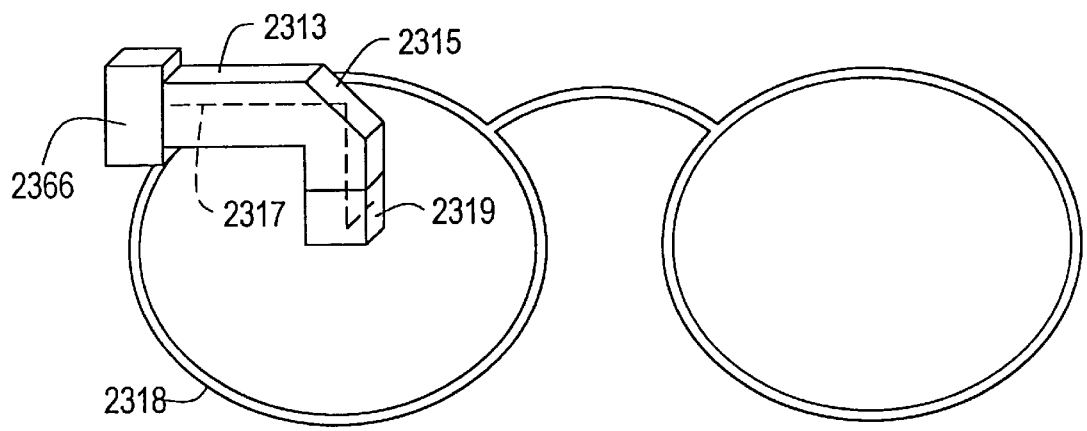
*FIG. 40*
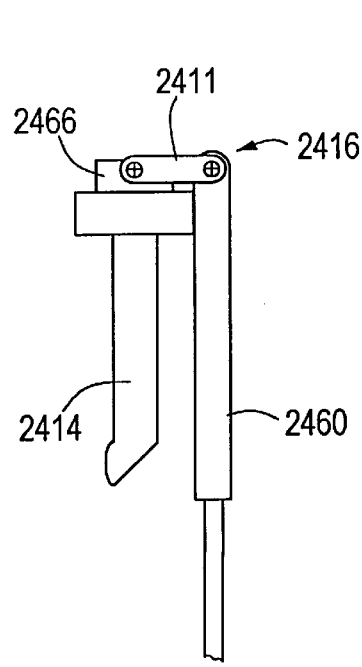 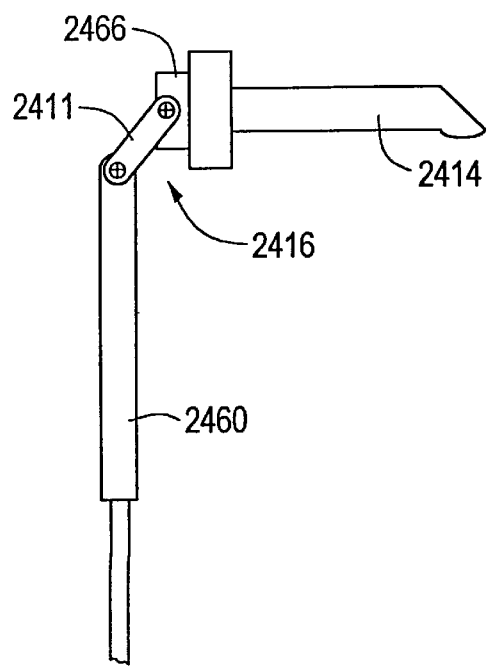
*FIG. 41*        *FIG. 42*

COMPACT IMAGE DISPLAY SYSTEM FOR EYEGLASSES OR OTHER HEAD-BORNE FRAMES

CROSS REFERENCE TO RELATED APPLICATIONS

This application is a continuation-in-part of U.S. application No. 08/844,098, now U.S. Pat. No. 5,886,882, filed on Apr. 18, 1997, and of U.S. application No. 09/170,887, now U.S. Pat. No. 6,023,372, filed on Oct. 14, 1998, the disclosures of both of which are incorporated by reference herein.

This application claims the benefit under 35 U.S.C. § 119(e) of U.S. Provisional Application No. 60/027,998, filed on Oct. 8, 1996, and U.S. Provisional Application No. 60/064,430, filed Oct. 30, 1997, the disclosures of both of which are incorporated by reference herein.

STATEMENT REGARDING FEDERALLY SPONSORED RESEARCH OR DEVELOPMENT

The invention was made with Government support under Contract No. DAAK60-96-C-3018 awarded by the Soldier Systems Command of the United States Army. The Government has certain rights in the invention.

BACKGROUND OF THE INVENTION

Head mounted image displays (e.g. helmets, goggles, and eyeglasses incorporating miniature displays) and other compact display systems which provide data in alphanumeric, video, or graphic form have applications in avionics, medicine, entertainment, and wearable computers, as well as numerous other fields. See for example U.S. Pat. Nos. 5,348,477, 5,281,960, 4,806,001 and 5,162,828. There are three principal types of prior art head mounted display systems: "see-through systems," in which the displayed electronic image is combined with the ambient imagery so that the user can see both images; "see-around systems" in which the displayed image occludes a part of the ambient imagery; and "full-immersion systems" in which the entire ambient image is blocked, so that the user sees only the electronically generated image. All three types of systems use various means, including lenses and the like, to project the image into the viewer's eyes.

The simplest systems are of the see-around type in which the electronic display is provided with one or more lenses and suspended in front of the user's eyes. A principal limitation of the device is that the display and optical system must be moved with respect to the head, or the head must be moved, to enable the user to see ambient imagery in the occluded field. A significant part of the occlusion results from the supporting structure and housing, as well as from the display itself. A second limitation of such devices is that the device is suspended from the head (or helmet, strap or other support borne by the head), so that the mass of apparatus adds an undesirable weight and/or torque to the head. A third limitation of the device is that position of the exit pupil of the optical system cannot be fixed accurately, meaning that the exit pupil of the optical system must be large enough to accommodate various motions of the device that occur during use.

Full-immersion systems have many of the same limitations as see-around systems. The head mounted system must be removed to view any ambient imagery. Typically, the systems comprise displays and lens systems similar to the see-around display, or comprise a display, lens system and reflective screen. These systems involve high weight, torque and volume.

See-through systems involve the most complex optical designs. Generally, the see-through system comprises a display, lens system, and viewing screen or combiner. All of the limitations of the see-around display are shared by the see-through display, except for the need to remove the head-mounted system to see ambient images. However, for this benefit, it is necessary to add further optical components and thus weight to the system.

All three of the above head mounted display types have the further limitation of requiring that the optical systems be mounted in goggles, helmets, strap-on bands, unusually bulky sunglasses frames having large visors and the like, rather than more conventional optical supports (such as the more simple support provided by conventional eyeglass frames). This limitation requires users to become accustomed to wearing such devices.

Another limitation of prior art displays is the need to provide illumination. For example, head mounted display systems using liquid crystal displays require lamps to illuminate the display. These lamps consume power and generate heat near the user's head and add to the overall volume and weight of the system.

A further and key limitation of the prior art eyeglass displays is the use of optical paths external to the eyeglasses system. For example, in U.S. Pat. No. 5,348,477, Welch describes a system comprising an image relay and a set of lenses and screens mounted external to an eyeglass frame and eyeglass lens. The use of a free space optical path, combiners and the like make miniaturization in a form approaching conventional eyeglasses quite difficult. Furness et al., in U.S. Pat. No. 5,162,828, have attempted to address this limitation with a see-through system based on a transparent screen, such as found in a goggle, with a display located at the top of the goggle or eyeglasses, and a mirror, which may be fixed or adjustable, located at the bottom of the transparency. This approach shows reduced complexity, but the system still requires at least one mirror positioned in an unconventional exposed location below or behind the transparency. The eyeglasses disclosed by Perera (U.S. Pat. No. 4,867,551 and 4,751,691) and Bettinger (U.S. Pat. No. 4,806,011) also require mirrors suspended from eyeglass frames. A particular limitation of free-space optical systems with mechanically suspended mirrors results from the fact that such appendages have a greater probability that the optical surface of the mirror will suffer damage during use, or will break off, or will damage the user's eye upon accidental impact. Additionally, because these systems include unusual optical appendages, they do not approach the ideal form of conventional eye wear.

There are many examples of displays mounted on the head, sunglasses, eyeglasses and the like. Display systems that make use of the user's existing eyeglasses or sunglasses, which may include prescriptive correction, are more simple in nature because they obviate the need for adding prescriptive correction to the display system. However, prior art displays mounted on eyewear or head-wear have the general limitation of obscuring a significant amount of the user's field of view.

For example, Perera in U.S. Pat. No. 4,867,551 describes a display to be mounted on eyeglasses, the limitation of which is the high degree of occlusion of the user's field of view beyond the display, and the use of non-axial optics which introduces distortion. A high degree of occlusion is also present in an eyeglass mounted display offered for sale by Albacomp Computers Corp. Other companies, such as Liquid Image or Virtual Vision, provide displays that are suspended by a cable, gooseneck fixture or other mechanical support in front of one or both of the user's eyes. Similarly, displays from Reflection Technology have been mounted on eyewear in order to provide a computer display in a mobile fashion, but this approach also highly limits the user's view of the surroundings.

Not only do such prior art displays obscure a large part of the user's visual field, but also the display obscures the user's face. The obscuration of the visual field is a limitation particularly in applications in which the user must be free to focus on the work at hand, without diverting attention to adjusting or removing the display.

Generally, head-mounted and helmet-mounted display systems are based on miniature displays having a diagonal dimension of 4 cm or less. The display systems that use such miniature displays must provide a lens near the eye for magnification, and to make possible comfortable viewing at near distances. The lens and any other associated optics that must be placed near the eye are termed the "eyepiece." Most prior art head-mounted systems also place the display (for example a miniature liquid crystal flat panel display) near the eye as well, which requires both a support fixture for the eyepiece, and a conduit for electrical cables to the display. These components (wires, liquid crystal display, and any other required circuits) are placed within an opaque housing near the eye. Consequently, such systems block a portion of the user's visual field, and also obscure the user's face. Obscuration of the face reduces the desirability of using the device in social occasions.

A helmet-mounted display is also known in which the image is provided by a glass fixture suspended in front of the user's face. The glass fixture is mounted to the helmet and contains an eyepiece near the eye. The glass fixture serves as a mechanical support for the eyepiece as well as an image conduit for the display which is mounted to the helmet. The limitation of this system, however, is its size and weight, and its configuration as a helmet.

SUMMARY OF THE INVENTION

The present invention relates to a compact, light weight head-borne image display system for use with a user's eye. The image display system includes a support frame configured to be supported by the user's head. A display assembly is supported by the support frame in front of an eye of the user. The display assembly comprises a display element operative to provide an image separate from ambient light. An optical relay having two optical surfaces is arranged to permit passage of ambient light through the two optical surfaces toward the user's eye. An optical pathway is disposed internally within the optical relay to receive light from the display element.

The optical pathway has at least a portion disposed along and between the two optical surfaces of the optical relay. An eyepiece assembly is disposed internally within the optical relay and comprises an interface disposed to redirect light, high has passed along at least the portion of the optical pathway, out of the optical relay to the user's eye.

The optical relay and eyepiece assembly are formed with one or more combiners comprising internal totally internally reflecting surfaces, partially silvered mirrors, or dielectric coatings, or holographic or diffractive surfaces and one or more optical surfaces for vergence correction, so that the image from the display element is relayed to the user's eye by a partially or fully reflecting surface located in the field of view of the user. Additionally, since the optical relay is at least partially transparent to external rays, with partially silvered mirrors or dielectric coatings, ambient scenery is presented relatively unimpeded to the user. These optical is elements may be mounted to a head-borne frame or embedded within an eyeglass frame or lens so that optical surfaces (lenses or reflectors) may be added to the system to add magnification to the display or to correct the vision of the user in the manner of conventional eyeglasses. The chief advantage of this approach over the prior art is that the optical system is reduced to a form consistent with integration within an eyeglass lens or with mounting to another head-borne frame, such as face masks, goggles, or head sets, with the consequent elimination of external appendages near the eyepiece and unconventional bulky optical components not normally found in conventional eyewear.

The display element may be mounted to a frame, such as an eyeglass frame, either lens holder or temple, or a face mask frame, or a head set, for example via a boom. The display element also may be located remote from the eyeglasses lens, if present, by using an image conduit such as a graded index lens conduit, a coherent fiber optic bundle, or a lens image relay so that the display may be located behind the head if desired for balancing the system weight on the head, or for relocating a source of heat (the display or backlight) away from the face, or for cosmetic or other reasons.

The image display system provides a compact device that may be remountably attached to a head-borne frame. For example, the display device may comprise a housing assembly having a mounting mechanism disposed to removably mount to the head-borne frame of the eyewear at a location outside of a user's field of view. Circuitry may be disposed within the housing assembly to receive data or video signals. The display or electronic imaging assembly may be supported by the housing assembly outside of the user's field of view and in communication with the circuitry within the housing assembly to produce an image.

Additionally, the display device can be made adjustable to allow the user to position the image in a convenient location in the user's field of view. The device can be added to or removed from eyeglasses or other head gear with little discomfort to the user.

This invention provides a new approach to a light weight, compact, ergonomic, display system that combines an image relay system and mechanical support with a simple mounting system that can be applied to eyeglasses or other head gear. The display device provides several improvements on the prior art, including the use of a miniature flat panel display mounted near the glasses combined with a transparent optomechanical fixture that suspends the eyepiece near the eye. The display device can be mounted to eyeglasses or other head gear, does not significantly obscure the field of view of the user, does not hide the user's face, provides a largely undistorted view of the displayed image as well as of the ambient scene, and is low in weight. Similarly, the view of the user's eye to another observer is largely undistorted as well. The display device is able to provide an image in a see-through manner, so that the user sees a superposition of the image from the display and the ambient image.

DESCRIPTION OF THE DRAWINGS

The invention will be more fully understood from the following detailed description taken in conjunction with the accompanying drawings in which:

FIG. 5A is a front view of a portion of an eyeglass frame for an image combining system with the combiner removed;

FIG. 5B is a side view of a mount for attachment of an optical path from an image source to the eyeglass frame;

FIG. 5C is a top view of a portion of the eyeglass frame of FIG. 5A with the mount removed;

FIG. 5D is a side view of the portion of the eyeglass frame of FIG. 5A with the mount and combiner removed;

FIG. 5E is a front view of the portion of the eyeglass frame of FIG. 5A with the mount and combiner removed;

FIG. 7 is a further embodiment of an image combining lens system of the present invention;

FIG. 8 is a still further embodiment of an image combining lens system of the present invention;

FIG. 14 is a cross sectional view of an embodiment of the present invention taken along A—A of the plan views of various lens shapes;

FIG. 19 is a schematic view of an adjustment mechanism;

FIG. 20 is a side view of a head set and display assembly of the present invention;

FIG. 31 is a plan view of an imaging assembly and optical element of the display device of FIG. 29;

FIG. 32 is an exploded view of a housing assembly of the display device of FIG. 29;

FIG. 33 is a cross-sectional view of the housing assembly of FIG. 32;

FIG. 34 is a cross-sectional view of the display device of FIG. 29;

FIG. 35 is a cross-sectional view taken along line 6—6 of FIG. 34;

FIG. 36 is a plan view of a further embodiment of a display device using a swivel fixture;

FIG. 37 is a plan view of the display device of FIG. 36;

FIG. 40 is a plan view of a still further embodiment of the display device illustrating an alternative optical path and optical element;

FIG. 41 is a plan view of a further embodiment of the display device using a link element;

FIG. 42 is a plan view of the display device of FIG. 41;

DETAILED DESCRIPTION OF THE INVENTION

Figure 1:
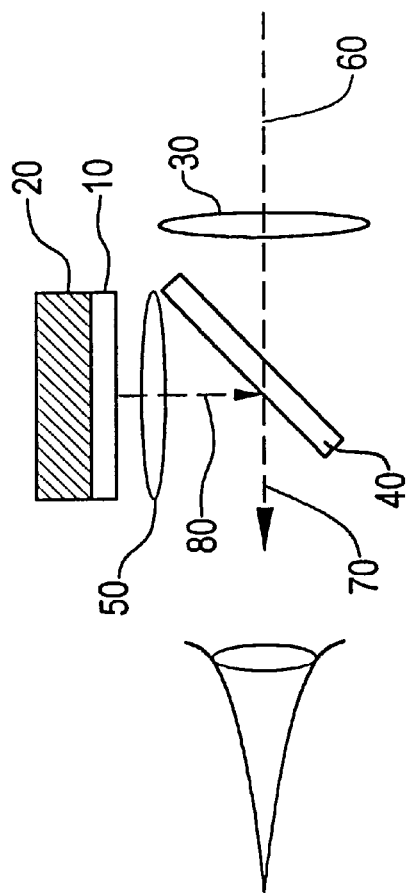
FIG. 1 is a prior art see-through head mounted display system.

FIG. 1 illustrates a prior art see-through head mounted display system based on lenses and combiners. A display 10 and back light 20 are mounted with a lens 50 above the user's line of sight. Rays 80 from the display 10 pass through the lens 50 and reflect from the combiner 40 toward the user's eye. Rays 60 from the ambient scene pass through lens 30 and also pass through combiner 40 and are coincident with rays 80 from the display. Thus the user perceives an image comprising the superposition of rays from the display and the ambient scene. The lenses in this system provide appropriate vergence for the rays so that the image is perceived at the desired depth. Typically the size of the various parts in this system are on the order of 0.5 to 2.0 inches to provide a large exit pupil and require housing and frames that make the system bulky. Additionally, the weight is distributed in such a way as to produce an undesirable torque on the user's head.

Figure 2:
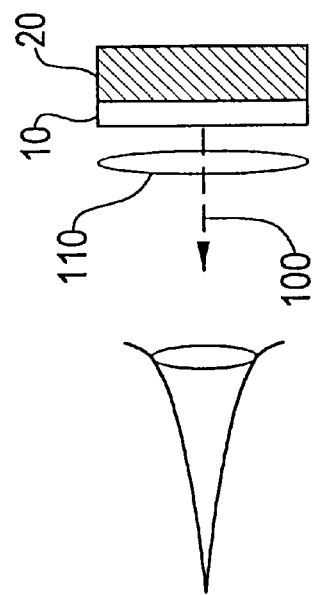
FIG. 2 is a prior art see-around head mounted display system.

FIG. 2 illustrates another prior art head mounted display approach involving a see-around technology. A display 10 and backlight 20 are mounted with a lens 110 so that rays 100 travel to the eye with appropriate vergence. This display system, having fewer parts, is somewhat lighter than the see-through display, but it occludes ambient rays. Additionally, both see-around and see-through displays mounted from hats or headbands have a tendency to snag on items in the environment.

Figure 3:
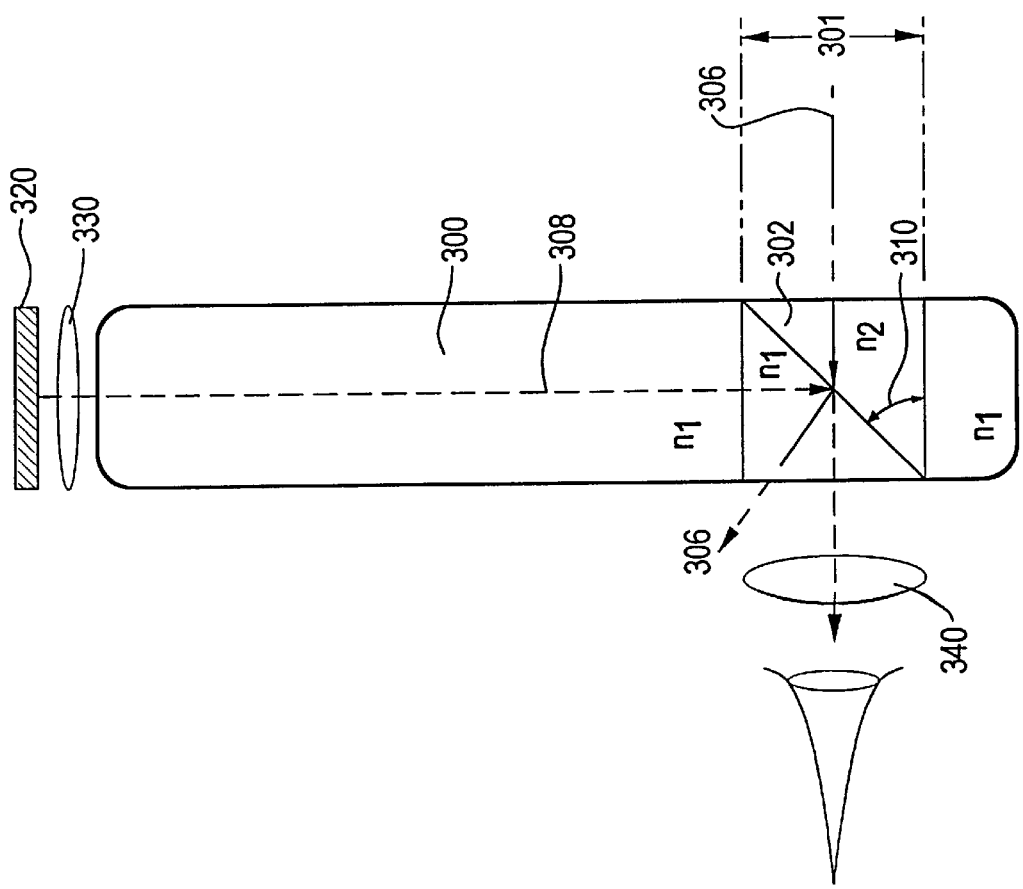
FIG. 3 is a head mounted image combining lens system of the present invention.

One preferred embodiment of the invention is shown in FIG. 3. An image source or display 320 and a lens 330 are mounted at the edge of a second "lens" or lens system 300 hereinafter referred to as "main lens" 300. Main lens 300 is more specifically in the form of an eyeglass lens (with or without vision-correcting optical power) and an eyepiece assembly shown here as insert 301, formed for example in the manner of a bifocal insert. It will thus be appreciated that main lens 300 replaces the single lens (or lens system in the case of a bifocal lens) in an eyeglass frame. The main lens 300 may be more precisely referred to as an optical system comprising embedded lenses and other optical components and surfaces, but is referred to here as main lens 300 for simplicity. It should also be appreciated that the term "lens" in general herein refers to a surface with optical power and/or to sets of multiple surfaces of optical power, either refractive, diffractive, reflective or otherwise in nature.

The insert 301 in the main lens 300 comprises two materials of different indices of refraction, $n_1$ and $n_2$, with $n_1$ being greater than $n_2$, so that light rays 308 from the image source 320 traveling through the material of higher refractive index and subsequently incident at the interface 302 between the materials are totally internally reflected toward a third lens 340. Ambient light rays 306 pass through the interface 302 and are refracted away from the third lens 340 thus improving contrast of the displayed image. The two lenses 330 and 340 are chosen such that the combined optical power forms a microscope thus allowing the image from the display to be viewed with the desired magnification. The two materials for example may comprise fused silica ($n_2$=1.458) and LaSFN$_9$ ($n_1$=1.85) so that rays with angle of incidence greater than 52 degrees will be totally internally reflected. Alternatively, an air or other fluid filled gap may be provided between the materials, or the lower index material may comprise air, another fluid or vacuum, so that if fused silica is used for the main lens 300, the critical angle for total internal reflection will be 43 degrees. The angle of the interface 310 may be designed for satisfying the condition that the angle of incidence exceed the critical angle for total internal reflection, and also for satisfying the optical requirements for positioning the image to be viewed. Also, the optical interface shown here is planar; however, it may be curved to provide an optical power.

An alternative embodiment comprises the use of an insert 301 comprising materials having thin-film interference coatings at the interface to combine the light paths, as is commonly accomplished in dielectric beam splitters and combiners. In such a case, the refractive indices $n_1$ and $n_2$ may be the same ($n_1$=$n_2$). Either method will work; however, the interference coatings are useful in see-through systems, whereas total internal reflection provides greater optical throughput along the desired paths in see-around systems. Metal-coated surfaces may also be used.

The display 320 may comprise a miniature flat panel display, a cathode ray tube or a scanning display as described in U.S. Pat. No 5,715,337, assigned to the assignee of the present application and incorporated herein by reference. The display 320 may be responsive to RF video signals with the RF link being analog or digital depending on particular application requirements and available technology.

Figure 4:
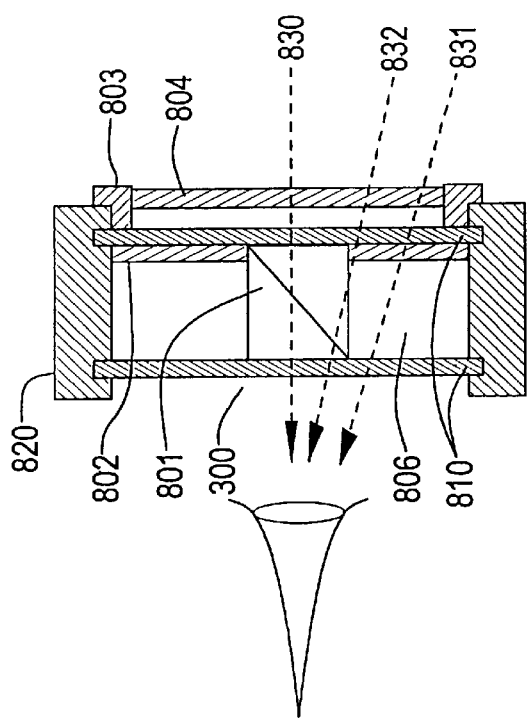
FIG. 4 is a further embodiment of a head mounted image combining lens system of the present invention.

FIG. 4 illustrates another method of forming the image combining system. In this system, a cube beam splitter 801 used in reverse as a combiner replaces the totally reflecting surface described earlier. The cube beam splitter, for example Edmund Scientific Part A45,111, has the advantage over the totally internally reflecting surface of introducing practically no refraction of ambient rays; however, the cube beam splitter only passes approximately 50% of the ambient and display light to the eye. However, for the case in which beam splitter 801 comprises a polarizing beam splitter, and display 320 provides polarized light (such as from a liquid crystal display or laser-scanned display), reflection in the range of 75 to 99% may be obtained, depending on wavelength of the display emission and optical design of the coatings in cube 801. The cube may also serve as an analyzer for a liquid crystal display, since it efficiently passes one polarization and not the other.

In this embodiment, a housing 820 provides a means to hold two glass or plastic plates 810 that are joined to the cube 801, the plates and other internal parts comprising the main lens 300. Light rays from an image source are incident through a hole 821 (see FIG. 6A) in housing 820. Ambient rays pass through one of three paths. The first path 830 passes through optional polarizing layer 804, through glass 810, through cube 801, through second glass 810, and then to the eye. A second path 831 passes through optional polarizing layer 804, glass 810, optional polarizing layer 802, second glass 810, and then to the eye. The purpose of the optional polarizing layers is to make possible an adjustment of the light level of the ambient scene reaching the eye to provide a balancing of the light level between the display and the ambient scenery, which is made possible by mounting optional polarizer 804 on a rotating bezel 803.

A third path 832 passes through optional polarizing layer 804, glass 810, optional polarizing layer 802, cube 801, and then through second glass 810 to the eye. Light passing along path 832 will suffer some distortion owing to the off-axis passage through the cube. This effect can be minimized by shaping the beam splitter in a conical form, and by filling the void 806 with a compound optically matched to the cube 801.

The cube beam splitter 801 may be designed and oriented to be sensitive to polarization as previously described, and oriented such that when aligned with the polarizing layer 802, the cube 801 and polarizer 802 absorb equal amounts of rays 830, 832, and 831. If properly aligned, the net transmission of polarized light across the main lens 300 is uniform and the external polarizer 804 may be rotated to adjust the light level of the ambient scene as viewed through the cube or otherwise.

Figure 6A:
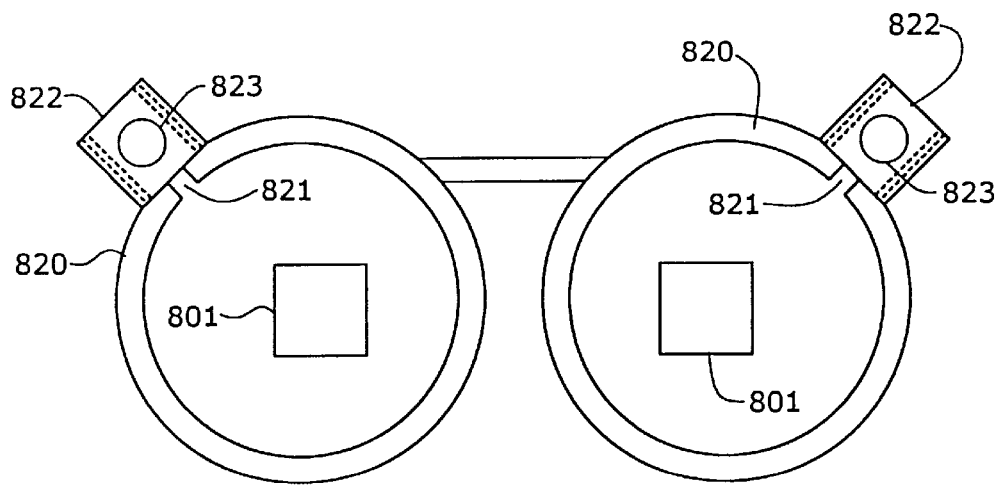
FIG. 6A is a front view of an eyeglass frame for a binocular image combining system.
Figure 6B:
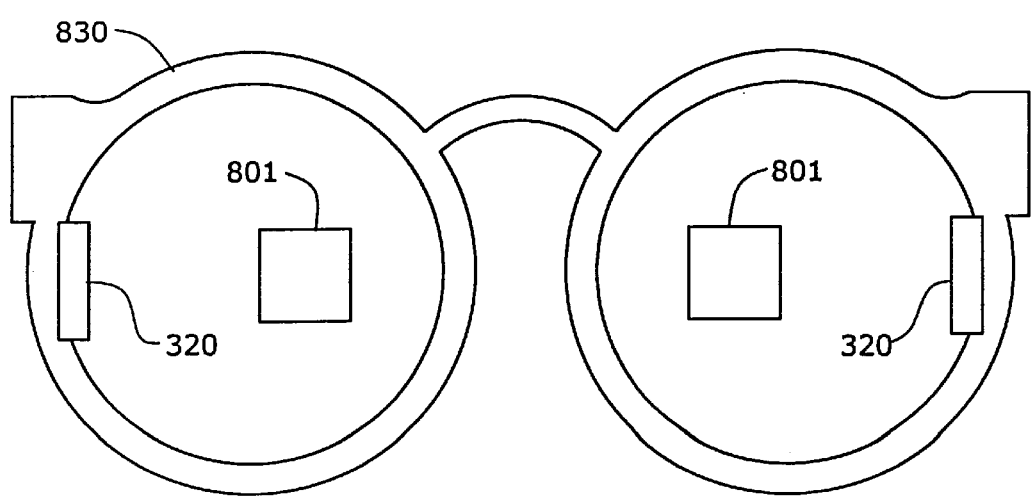
FIG. 6B is a front view of a further embodiment of an eyeglass frame for a binocular image combining system.

FIGS. 5A–5E and 6A illustrate some of the details of the assembly of an eyeglass frame for the device shown in FIG. 4. A triangular block 822 receives a pipe 823 which houses the optical path from the display, described further below. A mirror 824 reflects rays on the light path through an angle of 900, through the opening 821 to the combiner 801. The block 822 may be mounted to the housing 820 in any suitable manner, for example, by screws 825. Two housings 820 are assembled to form a pair of eyeglasses, as shown in FIG. 6A. Referring to FIG. 3, the cube 801 in position 301, lens 340 and display 320 may also be formed within the main lens 300 as a solid casting, which can then be mounted in conventional eyeglass frames 830, as shown in FIG. 6B.

FIG. 7 shows another embodiment in which the lenses 330 and 340 are replaced by lenses 360 and 370 respectively, which may be glued to the main lens 300 or which may be formed as part of the main lens 300 if for example the lens is injection molded. The main lens 300 can be formed as a single solid piece by embedding the optical parts in a solid clear or tinted material, such as an optical cement, polycarbonate, epoxy, polymethyl methacrylate, or glass. In such a case, the mold is provided with surfaces that will yield the desired optical power and/or reflections at various places on or within the main lens 300. The main lens 300 may also be formed from a plurality of cast, molded, or machined parts which are then bonded together to form a solid unit, or alternatively which are mounted in the manner shown in FIGS. 4 to 6. A further embodiment of this invention comprises the use of an integrated lens 360 with a separate lens 340 or vice versa. Additionally, lenses 330 and 340, or 360 and 370, or any combination, may comprise achromatic lenses for color correcting dispersion effects in the optical system, or other lens combinations to reduce image aberrations. It should be recognized that lens 360 is optional and may be eliminated in systems requiring simple magnifying optics.

Another embodiment of the lens system is shown in FIG. 8. In this design the lens 360 and display 320 are moved to a position behind the main lens 300. A reflecting surface 325 is provided in the form of a second insert 326 in the main lens 300 for the purpose of directing the incident image to the insert 301. Reflecting surface 325 may be of the type implemented in the insert 301, which itself may comprise cube 802, or alternatively may be replaced by a mirror mounted internal to the main lens 300 or externally, as shown in FIG. 5A. If the second insert 326 is polarizing, such as in a polarizing beam splitter, the insert 301 or insert 326 may act as the analyzing polarizer (the analyzer) for the case in which the image source 320 is a liquid crystal display.

In applications in which the display 320 is capable of providing an intense image display, the mirror may be designed to protect the user's eye in the unlikely event that the display regulating system fails. The mirror (at surface 325), functioning as an optical fuse, may protect the user from injury by being designed to absorb some of the incident light. To this end, one or more layers of materials having low thermal conductivity may be provided beneath the reflective layer of the mirror. With such an arrangement, the light beam may be made to heat the mirror faster than it heats the retina, thereby resulting in damage to the mirror more quickly than to the eye. One of the low conductivity layers beneath the mirror may comprise a material with a high coefficient of thermal expansion which would lead to a bubble or other de-focusing mechanism at the mirror designed to occur at a threshold energy flux below the damage threshold of the retina. The image source may also supply infra-red (IR) radiation to enhance this effect. The IR radiation would be removed by a filter elsewhere in the system to prevent it from reaching the user's eye.

Note that the display may be back-lit as previously disclosed, or may be illuminated by ambient light rays 401 and/or 402 and/or 403. Such a design, can work with the totally internally reflecting insert 326, or with a partially or fully reflecting mirror surface 325, or with a surface with a dielectric coating. A fraction of the rays 401, 402, and 403 will propagate to the display through the combiner 325. These rays will then be reflected from the display into the optical path leading to the eye. The optical system may be provided with a condensing or collecting lens to gather and concentrate the rays 401, 402, and 403. Additionally, the rays 401, 402, and 403 may be supplied by a lamp mounted optically to the main lens 300 for viewing when insufficient ambient light is available. For the case in which display 320 is a liquid crystal display, insert 326 may comprise a polarizing beam splitter which can act as a polarizer and analyzer for the display. This embodiment may be further improved by adding a crossed rotating system of polarizers as is well known in the art to provide an adjustment in the light level of the ambient scenery. In this way, the light from the display and the ambient scenery light level may be balanced. By using a liquid crystal shutter, the adjustment may be made electronically, and a sensor may be employed for automatic compensation or balance between the relative brightness of the images.

Figure 9:
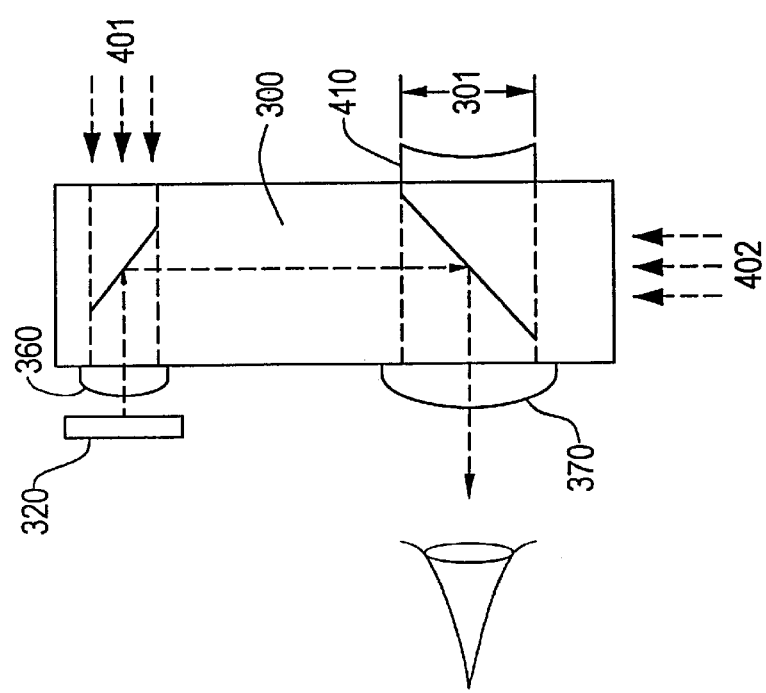
FIG. 9 is a still further embodiment of an image combining lens system of the present invention.

A further improvement to the designs in the foregoing figures can be made by adding a fourth lens 410 on the front of the main lens 300 over the insert, as shown in FIG. 9. The lens 410, being generally of a negative power, counters the positive optical power of the lens 370 so that rays 306 from the ambient scene can be viewed without significant magnification, while rays from the display, which do not pass through lens 410, are viewed with magnification. The lens 410 may have positive or negative optical power depending on the specific vision correction requirements of the user. Alternatively, the optical power of lens 410 may be chosen to provide magnification in the manner of a jeweler's loop. Other lens surfaces may be added on either side of the main lens 300 to correct the vision of the user, in the manner of ordinary eyeglasses, and any of the microscope lenses may be adjusted in optical power to correct the user's vision. Other lenses may be added to further correct the vision through lenses 370 and 410. Note also that these lenses may also be incorporated substantially within the volume of the main lens 300.

In embodiments in which lenses are provided within a solid main lens 300, such as by injection molding or alternatively by the machining of a set of parts to be assembled into a solid main lens, the index of refraction n and the radius of curvature of the lenses must be corrected from their values in air to obtain the desired optical power, within the potting, molding, or machined medium. The indices of refraction of the compounds and the lens material may be chosen from many compounds having indices in the range of 1.4 to 1.6 for optical polymers or glass, and 1.5 to 2.0 for various other optical materials. The molding compound may be chosen from the many commercial compounds with index of refraction matched to glass (n=1.46), and the lenses may be formed, for example, from $LaSFN_9$ (n=1.85). Alternatively, the optical power may be developed by providing an air gap or vacuum within the molding material or by materials of low refractive index, with the radius of curvature appropriately designed. Another approach is to fill such a gap with a liquid of high or low refractive index. A further alternative is to employ diffractive or holographic lens elements within the main lens 300.

Figure 10:
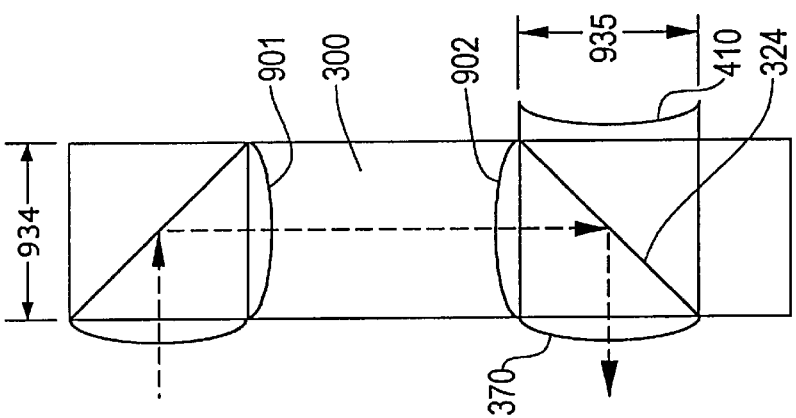
FIG. 10 is a still further embodiment of an image combining lens system of the present invention.

FIG. 10 shows another embodiment in which several field lenses 901, 902 are provided within the main lens 300. Such field lenses have the beneficial effect of distributing the optical power, thus reducing the need for high optical power at the eye lens. Such lenses also can serve to increase the field of view. These lenses and the other optical parts may be formed, for example, by the injection molding or machining of multiple parts, followed by coating of the interior surfaces with metal or dielectric layers, and followed further by the assembly of the parts to form the main lens 300 with embedded optical surfaces. Additionally, if the optical power of lenses 901 and 902 is sufficient, lenses 370 and 410 are not needed.

Referring to FIG. 10, it should be appreciated that in order to form a main lens 300 well-suited for incorporation in an eyeglass frame, it is desirable to maintain the thickness 934 of the main lens 300 within the range of conventional eyewear (less than 25 mm and preferably in the range of 1 mm to 15 mm). The surfaces of main lens 300 form an aperture stop in the internal optical path which is of a dimension equal to the thickness 934. The partially reflective interface 324 also forms a stop. Depending on the magnification of the lenses, these stops may restrict the field of view of the image from the display. This invention overcomes some of the limitations of these stops by using field lenses 901, 902.

Figure 11:
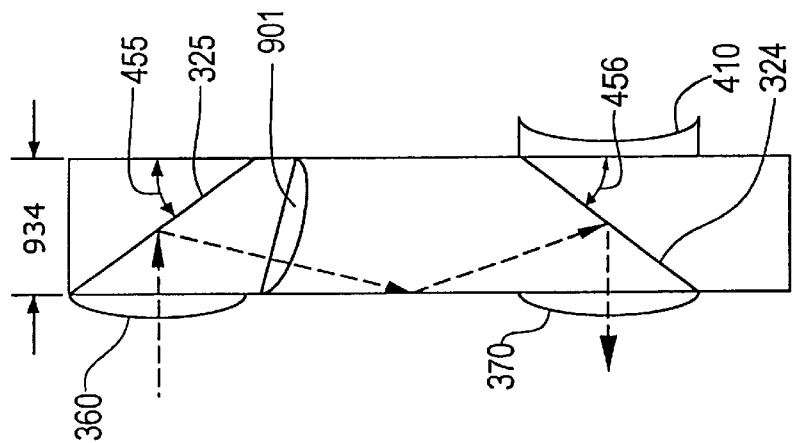
FIG. 11 is a still further embodiment of an image combining lens system of the present invention.

A second method of overcoming the stop introduced by the main lens 300 thickness 934 is shown in FIG. 11. The interfaces 324, 325 are set at angles 455 and 456 less than 45° so that the thickness 934 of the main lens 300 may be reduced. The optical path requires one or more reflections from the interior surfaces of main lens 300, which occur by total internal reflection as previously discussed. In such a case, embedded lenses 901 are canted appropriately, as shown in the figure.

Figure 13:
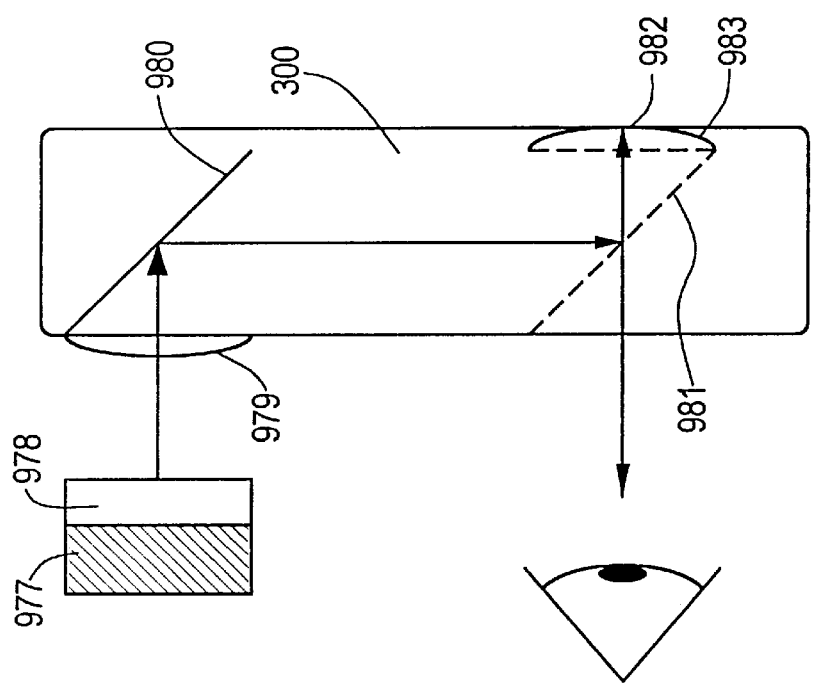
FIG. 13 is a still further embodiment of an image combining lens system of the present invention.
Figure 12:
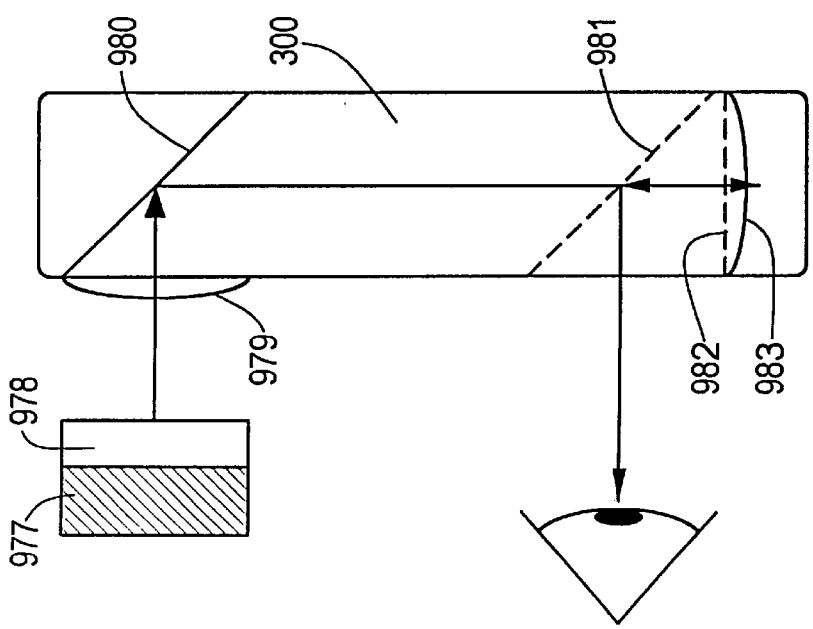
FIG. 12 is a still further embodiment of an image combining lens system of the present invention.

FIG. 12 illustrates how the main lens 300 can be formed using a concave mirror in the eyepiece. Linearly polarized light from a display 978 such as a liquid crystal display, and back light 977, enters the main lens through optional lens 979, and reflects from mirror 980. The light travels between the surfaces of main lens 300 to a polarizing beam splitter coating 981 which passes linearly polarized light of one polarization, and which reflects linearly polarized light of the orthogonal polarization. The polarization of the display and beam splitter surfaces are arranged so that the light from the display is passed by the beam splitter 981 through a quarter wave plate 982 to a concave mirror 983. The optical power of the concave mirror, in combination with the optical power of optional lens 979, modifies the vergence of the light from the display so that the image is magnified and placed at a convient distance for viewing. The light is reflected by mirror 983 and travels back through the quarter wave plate 982. The quarter wave plate is oriented so that the polarization of the light, which has passed twice through the plate, is rotated into the orientation which is reflected by coating 981. The viewer sees a virtual image in front of the glasses at a distance determined by the optical powers of the mirror 983 and 979, and the distances between the optical surfaces, by methods well-known in the imaging optics art. Similarly, the mirror 983 and quarter wave plate 982 may be placed relative to the optical path as shown in FIG. 13. In the case shown in FIG. 13, if a see-through display is desired, the mirror 982 must be partially silvered to permit the passage of ambient light to the viewer's eye. The method shown in FIG. 11, in which total internal reflection is used to change the angle of incidence upon the beam splitter coating, may be used with the approach shown in FIGS. 12 and 13 to increase the field of view.

It may be seen that the above optical system has application in see-around, see-through, or full-immersion systems. Various devices may be added to change the design from one type to another, or to permit the automatic changeover in system type. For example, lens 410 (FIG. 9) may be changed to an opaque disc to convert the see-through system to a see-around system. Alternatively, the insert 301 may be increased in extent to a large field of view, and the front surface of the main lens 300 may be provided with an opaque cover to form a full immersion system. Any of the opaque covers may be replaced by a liquid crystal shutter that can be electronically adjusted to reduce the light level of the ambient scenery or to block it out entirely. Photochromic materials may also be applied to control ambient light.

Additionally, a mirror or a prism with a totally internally reflecting hypotenuse as previously described may be used to form the insert 301. Such a device is no longer a combiner, but rather is a simple reflector which is all that is needed in a see-around system. This has an advantage over other reflector systems, because the reflecting surface is provided within the main lens 300 and therefore has safety and durability advantages over other approaches.

A further manner of forming the image combiner uses binary optics to form a diffractive optical element having a binary surface structure formed in a surface characterized in the simplest case by an angle 310 (FIG. 3) with respect to the base of the main lens 300. The advantage of a diffractive optical element is that the angle 310 may be made large while still directing light through lens 340, whereas at a reflective surface the angles are fixed by the law of reflection. This permits the field of view through lens 340 to be large, while also permitting the thickness of the main lens 300 to remain relatively small. Lens 340 and other lenses may also comprise diffractive optical elements. A disadvantage may be undesirable wavelength-dependent effects that could be present in a color system. However, the flexibility inherent in the optical design of the complete system described above, such as the ease of insertion of counter-balancing diffractive optical elements elsewhere in the optical path, makes possible the compensation for chromatic effects, if any.

The lenses described in the various embodiments may be selected to form an achromatic optical relay to remove chromatic aberrations inherent in the various parts of the lens system. It may also be seen that features of the various embodiments may be combined. Additionally, although the figures show singlet lenses, any of the lenses may be replaced by combinations of multiple lenses or surfaces designed to reduce distortion, improve field flatness or add other improvements to the resultant image seen by the user.

The main lens may be fashioned in a wide variety of shapes, as shown in FIG. 14. The cross section shows one possible internal optical design in which the light is relayed to the eyepiece by a mirror 325. The eyepiece comprises a polarizing beam combiner 920, quarter wave plate 930 and concave mirror 900. The internal optical path may be the same for each of the shapes shown, which are formed using standard edge grinding techniques. The shape of the main lens may even be simply the rectangular section comprising the optical path. The lenses of these various shapes may be held in a standard eyeglass frame, or an unconventional stylized frame resembling an eyeglass frame, or by any other head-mounted structure including booms, eyeglass clip-on devices or other appliances.

Figure 15:
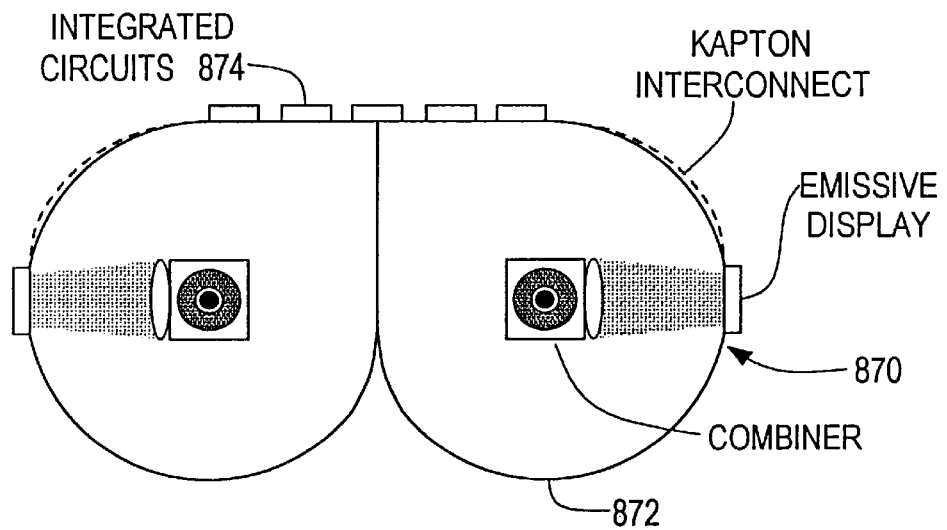
FIG. 15 is a face mask structure with integrated image combining system and computer circuits according to the present invention.

Although the foregoing discussion has focused mainly on the application of the optics in eyeglass form, the optics may also be applied in full face mask systems such as a diver's mask, a firefighter's face shield, an astronaut's space suit mask, a hazardous material body suit face mask, in headsets, which may incorporate other devices such as audio transducers or microphones, or the like. FIG. 15 shows an example of the integration of the optical system 870, a face mask structure 872, and computer circuits 874 to form a completely integrated computer within a face mask system. This is possible in systems in which the face mask provides sufficient area at the edge for integrated circuit mounting. As the size of integrated circuits decreases, it will become possible to mount displays and circuits in this way on eyeglasses. The display can be mounted directly to the edge of the lens, as indicated in FIG. 15. For diving masks, circuitry and displays can also be potted within the face mask at its edge to yield hermetic protection from water.

FIG. 15 shows two displays, which allow generation of a stereo image. The combiners can be located directly within the ordinary field of view (as shown) or can be located out of the ordinary field of view such that, to see the display, the user must look up, down, or to the side, to wherever the optical system has been placed. Suitable displays for a face mask are active matrix electroluminescent displays or active matrix liquid crystal displays, which are commercially available.

Figure 16:
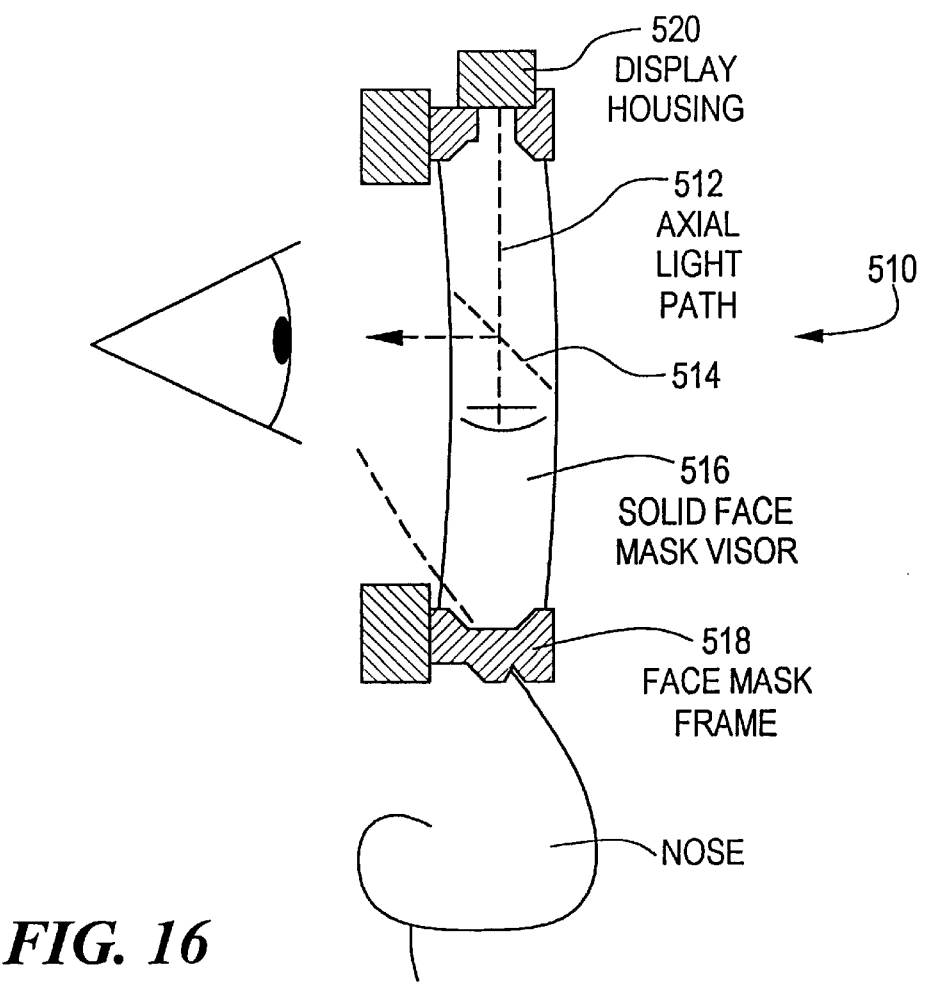
FIG. 16 is a side view of a face mask incorporating an internal optical relay and eyepiece assembly.

FIG. 16 illustrates a face mask 510 or goggles having a display assembly including an internal optical relay 512 and eyepiece 514 embedded within a solid face mask visor 516. The visor is held in position by a rubberized housing or face mask frame 518 as is commonly provided in SCUBA masks, ski masks, and other face mask systems. The visor typically has a thickness of between 4 mm and 12 mm. The display assembly includes a display which may be mounted directly against the visor or may be placed in a housing 520 so that the display is in optical communication with the optical relay in the housing.

Figure 17:
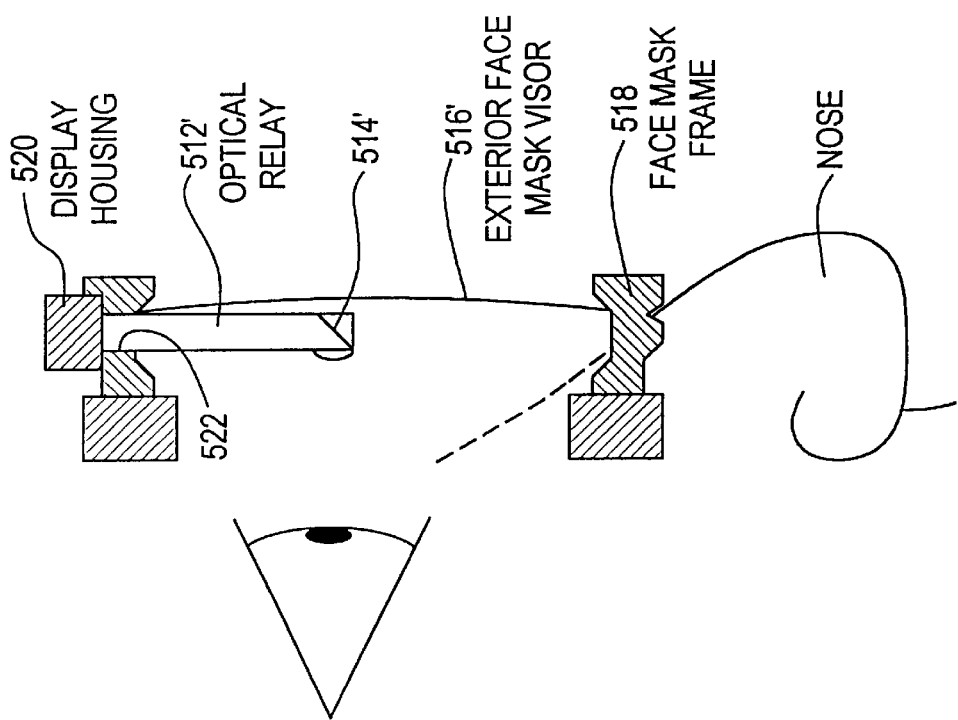
FIG. 17 is a side view of a further embodiment of a face mask incorporating an internal optical relay and eyepiece assembly.

FIG. 17 shows an alternative embodiment in which the display assembly is provided in the face mask, for example, behind an exterior visor 516'. In this case, the optical relay 512' protrudes through an opening 522 in the face mask frame 518. The opening may be at the top of the frame above the eye, as shown, or in some other location. The use of a clear optical relay minimizes interference with vision. The optical relay may be slidable within the housing to provide a vertical adjustment. The display housing and cables may be shaped to conform to the shape of the face mask frame. The optical relay and eye piece extend in the cavity behind an exterior face mask visor. This exterior visor may include an ultraviolet filter or other sun filter or shade, ballistic protective shield, chemical shield, or other visor intended to protect the face. By placing the optical components behind the exterior shield, the optical coatings on the exterior shield do not interfere with the visibility of the eyepiece. Additionally, the optical device is protected by the exterior visor. Alternatively, the device may be positioned in front of the exterior shield. The device may be remountably clipped to the face mask frame, which may be useful for quick attachment and detachment of the display device.

Figure 18:
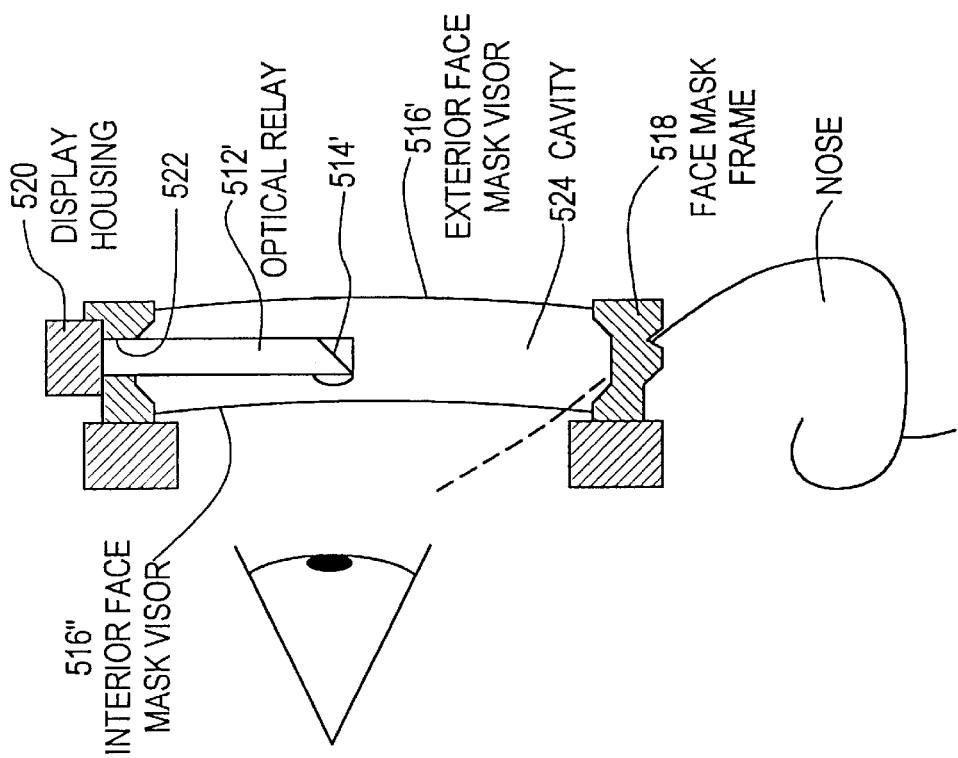
FIG. 18 is a side view of a still further embodiment of a face mask incorporating an internal optical relay and eyepiece assembly.

A further alternative is the use of both an exterior visor 516' and interior visor 516", illustrated in FIG. 18. In this case, the optical relay may be located in a cavity or space 524 between the exterior and interior visors. The interior visor can be used to provide a greater degree of ballistic or other protection and may also protect the face from contact with the optical relay in the event of an accidental compression of the face mask against the face.

FIG. 19 illustrates a detail of one possible adjustment mechanism for the display shown in FIG. 17. The optical relay extends through a ball and socket joint 526 mounted within the face mask frame 518. The optical relay 514' can slide back and forth to provide a translational adjustment of the position of the eyepiece. Additionally, the ball can rotate in the socket to provide a range of angular adjustments of position of the eyepiece 514'.

A display device on a head-born audio set 530 (an audio head-set) is shown in FIG. 20. The head-set includes a frame 532, a head pad 534 for wearing over the user's head, and an ear cup 536 which fits over the user's ear. A boom 538 is attached to the frame of the device in the manner of a mic boom to extend near the user's mouth. The display housing 540 is mounted on a display boom 542 which is attached to the frame so that the optical relay and eyepiece are positioned in front of the eye. The display boom may be attached to the frame in any suitable manner, such as with a bolt and nut to provide an adjustable clamping mechanism 544.

Figure 21:
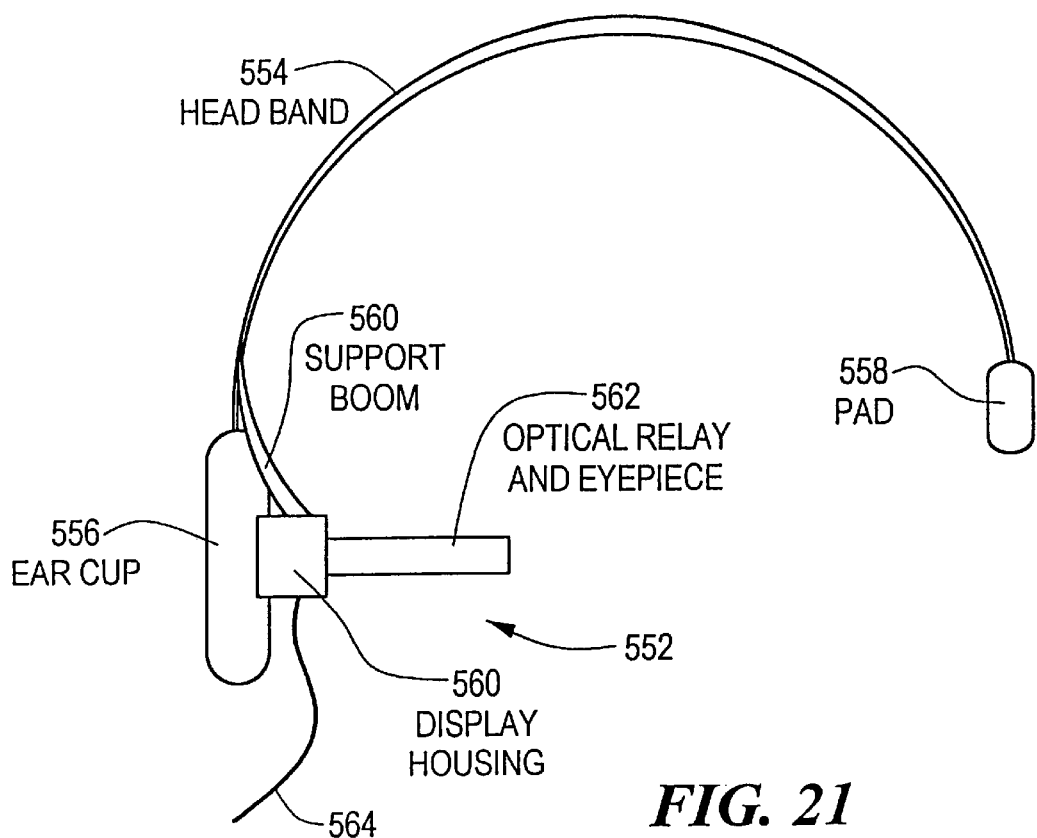
FIG. 21 is a front view of an alternative embodiment of a head set and display assembly.

FIG. 21 shows an alternative embodiment in which the display assembly 552 is attached to a head band 554, such as head bands which are customarily used for light weight audio head transducers. This type of head band may include transducers mounted in one or two ear cups 556. In the one-ear cup device, a pad 558 may be provided at the other end of the head band. A boom 560 is attached to the head band 554 to support the display in a housing 560, optical relay and eyepiece 562, and cable 564. The boom may be remountably attached to the head band if desired. In an alternative embodiment, the head band may include no transducers, in which case a simple pad is mounted at each end of the head band.

Figure 22:
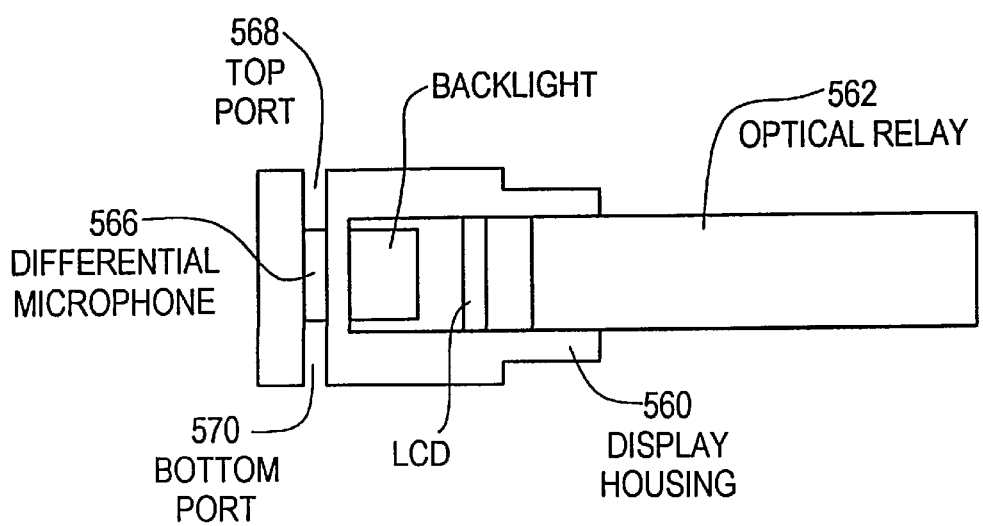
FIG. 22 is a schematic view illustrating a display assembly and microphone.

The display housing may also include a miniature microphone 566 customarily used in hearing aids, as shown in FIG. 22. The microphone may comprise a differential noise cancelling design or phased array positioned to preferentially collect audio signals from the direction of the user's mouth. FIG. 22 shows a differential microphone in acoustic communication with the environment through top and bottom acoustic ports 568, 570. Sound enters the two ports and is acoustically subtracted at the microphone so that only the difference in acoustic signals is converted to an electrical signal. The microphone selects sounds from the area of the user's mouth, which enter the lower acoustic port in greater magnitude than the top port, whereas other environmental sounds enter the ports in approximately equal magnitude. The ports can be configured mechanically to provide the greatest possible acoustic selectivity for the user's voice. In this way, the display housing 560 can incorporate a noise cancelling microphone design. The microphone is in electrical communication with audio circuits in the computer or other device through wires in the cabling. In this way, the system may obviate the need for a separate microphone.

Figure 23:
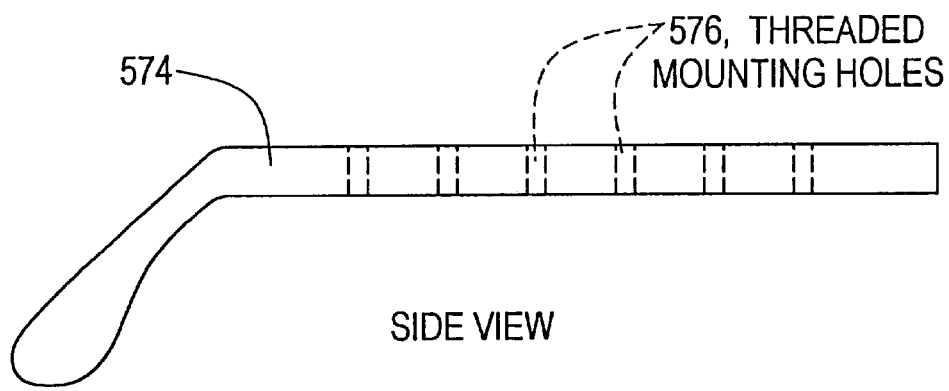
FIG. 23 is a side view of an eyeglass temple according to the present invention.
Figure 24:
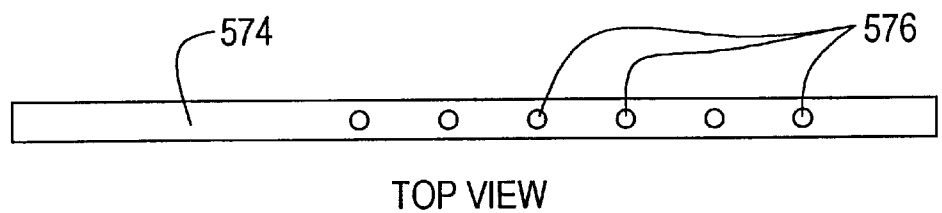
FIG. 24 is a top view of the eyeglass temple of FIG. 23.
Figure 25:
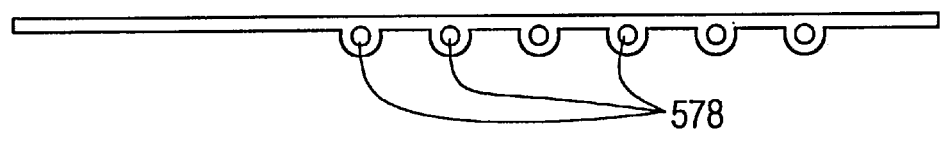
FIG. 25 is a side view of an alternative embodiment of an eyeglass temple according to the present invention.

FIGS. 23 and 24 show a temple design for remountable attachment to eyeglasses. The temple 574 is provided with a series of drilled and tapped holes 576 which provide a mounting surface for remountable displays, cameras, audio or other hardware. The temple may comprise metal stock with a square cross section having a cross sectional length in the range of 2 mm to 6 mm. Alternatively, to reduce the weight of such a system, the cross section may be minimal (nominally 1 mm) except at the locations of the attachment holes 578, as shown in FIG. 25.

Figure 26:
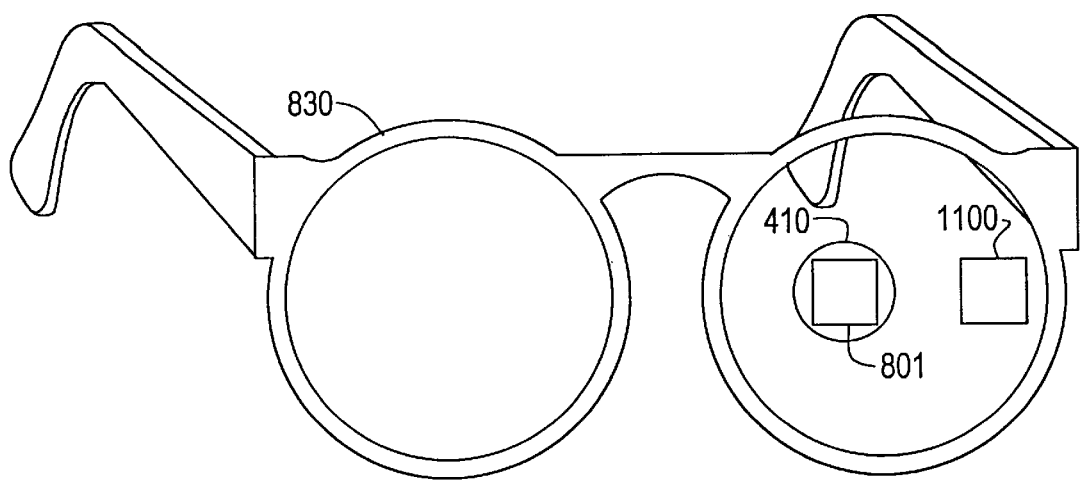
FIG. 26 is a schematic perspective view of a pair of eyeglasses built according to the present invention.
Figure 27:
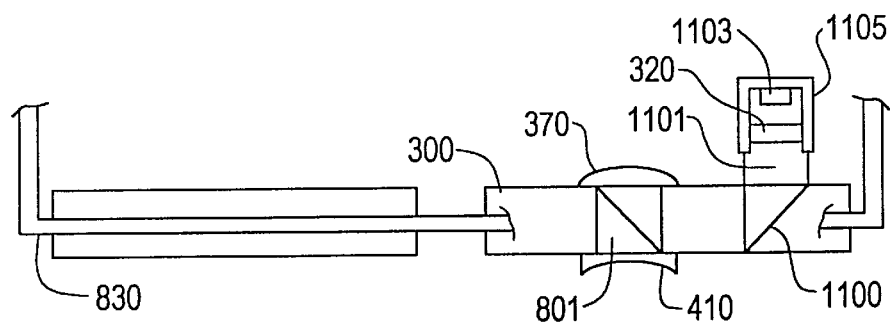
FIG. 27 is a top plan view, partially cut away, of the eyeglasses of FIG. 26.

Eyeglasses displays built in accordance with the invention described herein are illustrated in FIGS. 26 and 27. In this embodiment, the main lens 300 is housed in a commercial eyeglass frame 830. The main lens 300 comprises an embedded polarizing beam splitting cube 801 and an embedded prism 1100 which serve to reflect light from the active matrix liquid crystal display 320. The display is lit by backlight 1103 and the display and light are contained in housing 1105. The display is connected electrically to electronic circuits (not shown in FIGS. 26 or 27). The display 320 is mounted optically to spacer 1101 so that the index of refraction of the medium between the display and the surface of lens 370 is relatively well-matched to minimize internal reflections, the indices of refraction of the materials being in the range of 1.4 to 1.6. The display 320 is positioned so that the polarization of light emitted by the display is in a favorable direction for reflection by cube 801 toward the eye, with minimal transmission through the cube's interface. Lens 370, a singlet plano-convex lens having a positive power, reduces the vergence of rays from the cube 801, thus enabling the user to perceive a virtual image at approximately 50 cm. Lens 410, a singlet plano-concave lens having a negative power, pre-corrects light from the ambient scene so that in combination lenses 370 and 410 transmit light relatively free of vergence change. The optimized selection of the relative power and spacing of lenses 410 and 370, and/or the use of multiple lenses (doublets for example) as provided for in this invention, will yield reduced overall distortion of the ambient image as seen through the cube. The overall thickness of the main lens 300 (934 in FIG. 10) in this embodiment is 6.25 mm.

Figure 28:
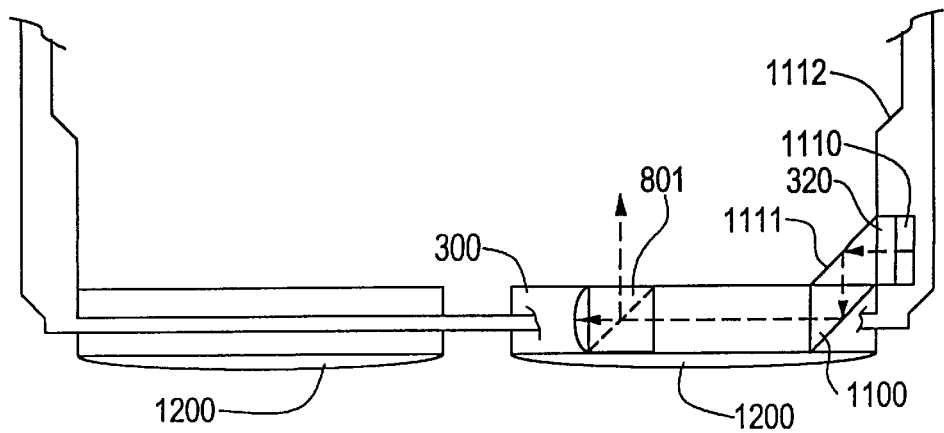
FIG. 28 is a plan view of a further embodiment of a pair of eyeglasses according to the present invention.

Complete concealment of the display system within the eyeglasses frame 830 and an improvement in the optical design are possible by repackaging the backlight 1103 and display 320 so as to be contained within a housing internal to the eyeglass frame, and by use of the main lens design shown in FIG. 12. FIG. 28 illustrates a method of packaging a flat backlight 1110, display 320 and prism 1111 within the temple 1112 of eyeglasses to conceal the display. Additionally, the mirror 983 and plate 982, or other optics, can be embedded within the main lens 300 as shown in FIG. 28 or as previously described herein. Prescriptive correction may be obtained by bonding lenses 1200 to the front surfaces, as shown in FIG. 28, or to the inside surface. Alternatively, prescriptive correction curvature may be formed integrally to main lens 300. The lenses 1200 may be concave or convey. Sensors and lenses (i.e. a camera system) can be added, as can an eyetracking system, both of which have been previously described herein. In this embodiment, the appearance of the main lens 300 is similar to a bifocal lens. FIG. 28 shows a monocular system; however, two main lenses 300, left and right, may be employed for a binocular system. Also, the left main lens 300 may house the display system, while the right main lens 300 may house a sensor system. The presence of embedded optics can be further disguised by using polarizing, photochromic, tinted, or reflective films in the manner of sunglasses. The result is an eyeglasses display system having the aesthetic appeal of conventional eyewear, with no display, camera, or eye-tracker evident upon casual inspection.

Figure 29:
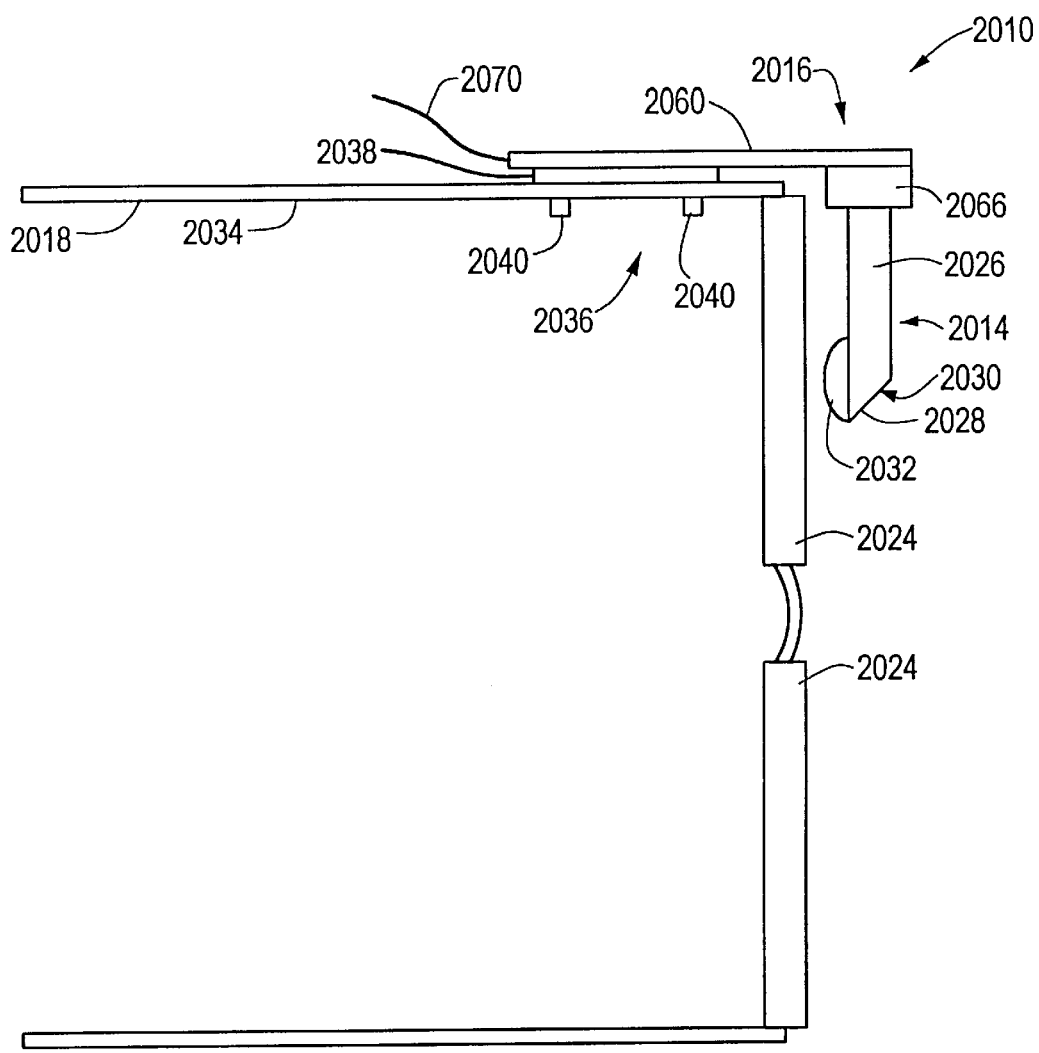
FIG. 29 is a plan view of a display device mounted to a pair of eyeglass frames according the present invention.

A display device mountable to an eyeglass frame is illustrated generally in FIG. 29. The display device 2010 comprises an imaging assembly 2012 (see FIGS. 32–34), an optical element 2014, and a housing assembly 2016 which is removably mountable to eyeglass frames 2018.

Referring to FIGS. 29–34, the housing assembly 16 includes an enclosure 2020 for containing circuitry 2022 for receiving data or images relayed to the display device 2010 and for containing the imaging assembly. The circuitry may include integrated or discrete circuits which are connected to the imaging assembly. Light from the imaging assembly is relayed via the optical element 2014 through the eyeglass lens 2024 to the user's eye. The optical element 14 comprises a transparent fixture or relay 2026 and an eyepiece assembly 2028 which, in the embodiment shown in FIGS. 29 through 31, comprises a mirror 2030 and lens 2032. The housing assembly 2016 is mounted to the temple 2034 of the user's glasses 2018 by a clamping assembly 2036 illustrated by a mounting fixture 2038 and clamps 2040. The relay 2026 and eyepiece assembly 2028 are positioned in front of the user's eyeglass lens 2024 so that the image is viewed through the eye lens 2032 which is positioned by the user in a convenient location for viewing. The housing assembly is located substantially outside the user's field of view, which means that the housing assembly does not block the user's main field of view. For corrective lenses, the main field of view is defined by the view through the lens. For non-corrective lenses such as safety glasses, the main field of view is defined by the area bounded by about 450 to the sides of a line looking ahead and about 20° above and below the line the looking ahead.

The imaging assembly 2012 may comprise a transmissive or reflective miniature active matrix liquid crystal display (AMLCD), an electroluminescent display, or any other miniature flat panel display having a screen diagonal of less than 2 cm. For example, the Kopin Cyber Display P/N KCD-QMO2-AA is suitable. Additionally, the imaging component may comprise a scanning display as described in U.S. Pat. No. 5,715,337 or any number of other imaging elements formed from liquid crystals, light emitting diodes, electroluminescent materials or field emissions displays. In FIGS. 32 through 34, an AMLCD image generator 2040 with a backlight 2042 is shown. The backlight may be made from any number of illuminators such as light emitting diodes, incandescent lamps, lasers, or other light emitting devices. For a reflective AMLCD, the backlight is repositioned as a front light by methods known in the art.

The optical element 14 preferably comprises five optical surfaces 2044, 2046, 2048, 2049, and 2050 (FIG. 34). The optical element 2014 is preferably rectangular in cross section, as shown in FIG. 35. The surfaces 2052 and 2053 may optionally also be of optical quality, or may be frosted or blackened, and may or may not be optically parallel. Preferably, sections of the optical relay 2026 within the user's main field of view are optically clear and of uniform index of refraction. The surfaces 2049 and 2050 are polished and optically parallel so that ray 2054 representing a ray from the ambient scene traverses the relay with little or no change in propagation angle.

Surface 2044, which may optionally be formed by a lens 2045, receives rays created by the imaging assembly. The rays propagate through the relay 2026 to the surface 2046, which comprises a mirror 2030 in the embodiment illustrated in FIGS. 30 through 36. The sides of the relay 2026 are preferably parallel to minimize refraction and thus displacement in the image. The mirror 2030 reflects the light toward the surface 2048 of the lens 2032. The lens 2032 modifies the vergence of the rays from the imaging assembly 2012 so that the image can be viewed with magnification and with the image formed at a comfortable distance between about 25 cm and infinity, depending on lens positions and focal lengths. The typical focal lengths of the lenses 2045 and 2032 are in the range of 20 to 100 mm. The lens surfaces 2044 and 2048 modify the vergence of the light from the imaging assembly to create a virtual image in front of the user at a distance of between 25 cm (close) and infinity. The distance of the virtual image may be set by selection of the focal length of the lens surfaces 2044 and 2048 and by adjustment of the distances between the lens surfaces 2044 and 2048 and the imaging assembly. Other folds using mirrors may be added to the optical path to relay the light on other optical paths if desired, or the light may be relayed by total internal reflections occurring along the sides of the relay 2026.

Figure 30:
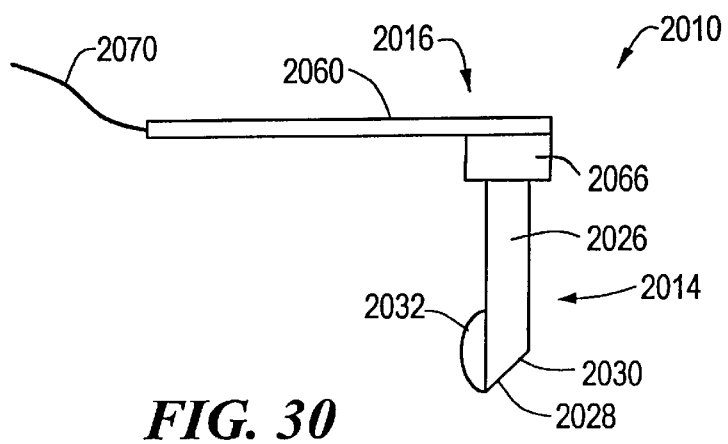
FIG. 30 is a plan view of the display device of FIG. 29.

The display device of the present invention utilizes largely transparent relay optics. FIGS. 29–31 illustrate in particular a "see-around" embodiment of the invention. The relay 2026 serves both as a mechanism for transmitting the image to the eyepiece assembly, and also as a structural member for supporting the eyepiece assembly in the user's field of view. Since the relay 2026 is transparent, the occlusion of the user's visual field is minimal or for certain see-through designs (for example FIG. 38), zero, and the obscuration of the user's face is minimal. Alternatively, a cover could be placed over or formed within the optical element to block ambient light from passing through the optical element if desired, for example, to reduce glint or other undesirable reflections. Additionally, if a hinge is provided within the unit, discussed further below, the optical element 2014 can be swung out of the user's visual field when not in use, so that the obscuration can conveniently be eliminated. The invention thereby provides a miniature, clear, optical element 2014 so that the user's vision is not significantly impeded by the presence of the display. Additionally, the present invention can be made very small, because the imaging assembly is located at the side of the user's eyeglasses, thereby minimizing the amount of structure in front of the user's eye.

Referring to FIGS. 32 through 34, the housing assembly 2016 comprises a body 2060, preferably having an open side 2062 which is covered by one or more coverplates. In the embodiment shown, two coverplates 2064, 2066 are used. The components to receive the data and/or drive the display are mounted within a cavity 2068 in the body. Data or images may be relayed to the device by a cable 2070 which enters the body 2060 through an aperture 2072 at one end thereof. The cable may comprise wire, one or more optical fibers as described in U.S. Pat. No. 5,715,337, or a fiber optic coherent bundle image conduit. Alternatively, the data or images may be relayed to the device by radio frequency (RF) transmission.

The coverplates 2064 and 2066 are affixed to the body 2066 in any known manner, such as with screws or adhesive, after insertion of the components. In the preferred embodiment, the components include a flexible circuit 2074 made of Kapton or other material known in the art, upon which is provided metal conductors or traces which connect the various components, such as terminating resistors 2076, 2078 to input cable 2070. The flexible circuit also connects the cable to one or more LEDs that form the backlight 2042, and the second flexible circuit 2080 that connects the system to the display 2040. The display is visible through an opening 2082 in the coverplate.

Referring to FIG. 34, the optical element 2014 may be affixed to the coverplate 2066 at a collar 2084. The collar may be affixed to the coverplate in any known manner or may be formed integrally with the coverplate, such as by molding. The optical element 2014 may be held in place by friction so that adjustments in focus may be made by the user, simply by moving the optical element 2014 with respect to the imaging assembly, by sliding the optical element within the collar 2084. A friction lock may be added to lock the optical element in a desired position relative to the imaging assembly, as would be known by those of skill in the art. Alternatively, the optical element may be fixed in place by adhesive, screws, or any other manner known in the art. In this case, the position of the optical element 2014 in the collar is adjusted during assembly to provide the required distance between the optical surfaces of the optical element and the imaging assembly. Typically this distance is 10 to 15 mm, but it can be zero if the cavity between the imaging assembly and the entrance surface 2044 of the optical element 2014 is filled with index of refraction-matched epoxy.

Figure 44:
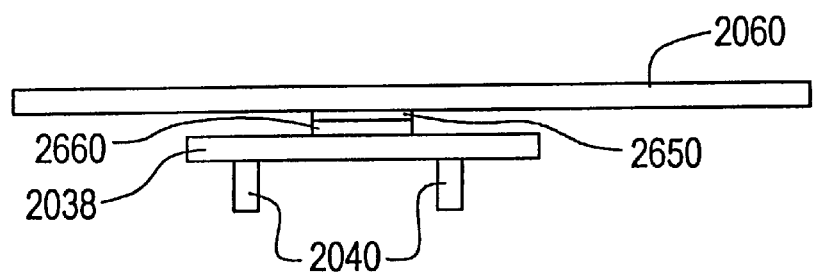
FIG. 44 is a plan view of a further embodiment having a rotatable adjustment mechanism.

The clamping assembly 2036 may be affixed to the housing assembly in any suitable manner. For example, the mounting fixture 2038 may be adhesively or otherwise fastened to the coverplate 2064. The clamps 2040 may be configured to allow the display device to be positioned at a variety of elevations with respect to the temple. In another variation, the body 2060 may be attached to the mounting fixture 2038 by a rotary joint formed by discs 2650 and 2660, as illustrated in FIG. 44. These discs rotate with respect to each other about a central pivot point and may have click stops built within to hold the device at various predefined angles with respect to the eyeglass temples, as would be known by those of skill in the art.

In an alternative embodiment, the optical element 2014 may be mounted on a swivel fixture 2090 as shown in FIGS. 36 through 37. The swivel fixture 2090 pivots around a pin 2092 so that the device can fold up in a compact form for storage or convenience while remaining attached to the eyeglasses.

Figure 38:
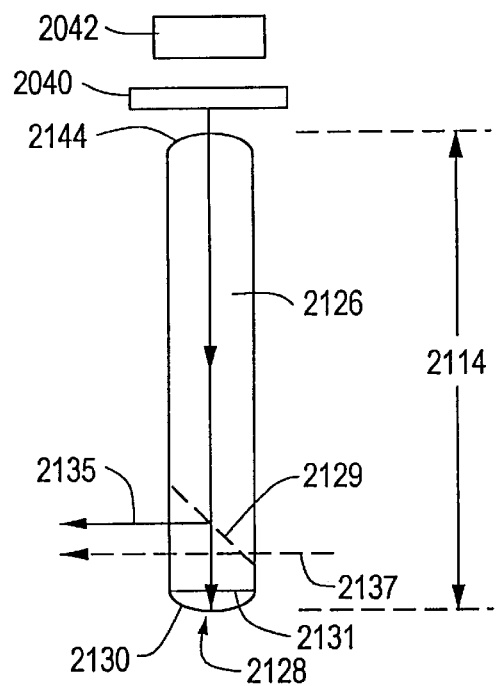
FIG. 38 is a plan view of a further embodiment of an optical element.

Another embodiment includes a non-occluded design of optical element 2114, as shown in FIG. 38. In this design, the eyepiece assembly 2128 comprises a polarization beam-splitter coating 2129, quarterwave plate 2131, and focusing mirror 2130. Polarized light from the display is passed by the beam-splitter coating 2129, through the quarterwave plate 2131, to the focusing mirror 2130. The reflected light passes again through the quarterwave plate 2131, and the light, having passed twice through the properly oriented quarterwave plate, has a polarization which is rotated in a direction orthogonal to the original polarization, and the light is therefore reflected by the coating 2129 to the eye, as shown by light ray 2135. Light having polarization oriented properly with respect to the beam splitter 2129 from the ambient beyond the device, represented by light ray 2137, passes through the eyepiece.

Figure 39:
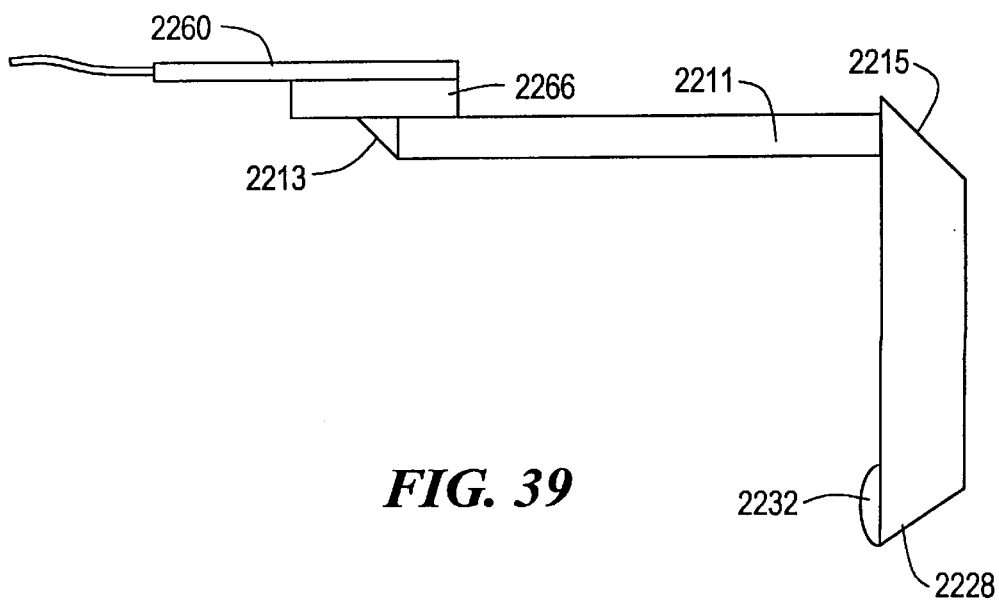
FIG. 39 is a plan view of a further embodiment of the display device using a graded index lens.

Yet another embodiment is shown in FIG. 39. The image is relayed from an image assembly in the housing 2226 to the eye lens 2232 by an image relay comprising a graded index lens 2211 and mirrors 2215 and 2228. Alternatively, the relay may comprise a coherent fiber bundle or conventional lens relay. Such image relays may be formed from polished glass to reduce the obscuration and to improve peripheral vision. This embodiment further removes obscuring surfaces from the user's face. The device functions in the following way. The image is provided by a display as previously described. The image is placed at the focal plane of the relay 2211. For the graded index relay, this is accomplished through a reflection at mirror 2213, so that the object image is at the entrance pupil of the relay system. The relay forms an image at its distal end which is relayed to the eyepiece assembly 2228 by a mirror 2215.

FIG. 40 illustrates another embodiment of the remountable display device. In this embodiment, the light is relayed from an imaging assembly in the housing 2366 along an optical conduit 2313 to a reflective surface 2315. The reflective surface may comprise a polished glass surface, in which the reflection occurs by total internal reflection, or it may comprise a metal or other coating intended to reflect the rays from the imaging assembly within the display housing toward the eyepiece assembly 2319 along the light path 2317. Any number of folds of this type may be incorporated to cause the eyepiece and housing assembly to be placed in convenient, ergonomic, or aesthetic locations. For example, for convenience, the housing assembly may be fixed to the frame 2318 in a position in which it is easy to attach or detach the device. Ergonomic considerations include obtaining a degree of balance in the device which can be the result of placing the housing and part of the optical conduit over the frame so that the device's center of gravity resides over the frame. Aesthetic considerations include minimizing the amount of surface area of the device around the user's face.

FIGS. 41 and 42 illustrate a further embodiment of the display device with a link element 2411 that connects the imaging assembly and optical element 2414 to the housing assembly 2416. The housing assembly includes a main body 2460 which contains the connections for the cable and the flexible circuits as well as electronic components. A further body 2466 supports the imaging assembly. The link element 2411 connects the main body 2460 and the further body 2466 and provides a support for wires connecting the components in the main body with the imaging assembly. The link element allows the optical element to be folded out of view, as shown in FIG. 12, without adjusting the mounting mechanism that attaches the housing to the temple of the user's eyeglasses. The link element also allows some adjustment of the position of the optical element in front of the eyeglass lens.

Figure 43:
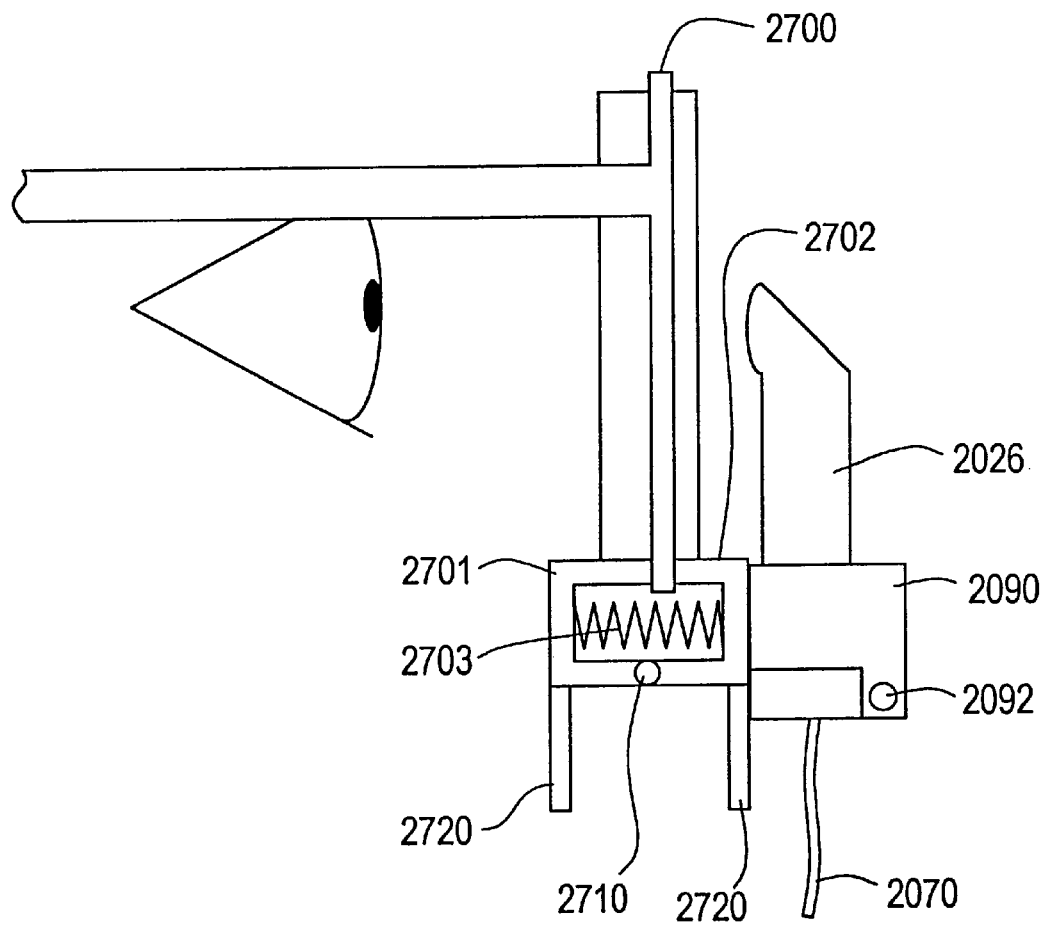
FIG. 43 is a side view of a further embodiment of the display device using a mounting along the outer bottom edge of an eyeglass frame.

FIG. 43 illustrates a method of remountably attaching the device to the eyeglass frame front 2700. A clamping apparatus 2701 hinged at point 2710 and drawn together by spring 2703 is affixed to the bottom of the frame front below the lens. The clamp may be shaped in a manner similar to the curvature of the frame to provide increased contact area between the clamp and the frame front. Small handles 2720 are provided to apply force against the spring 2703 to release the clamp. Affixed to the clamp 2701 is the housing 2090 of the display device that has been previously described. The optical relay 2026 extends into the user's main field of view to provide an image. Any of the foregoing adjustments and pivots may be implemented in order to position the image at a location convenient for viewing.

Figure 45:
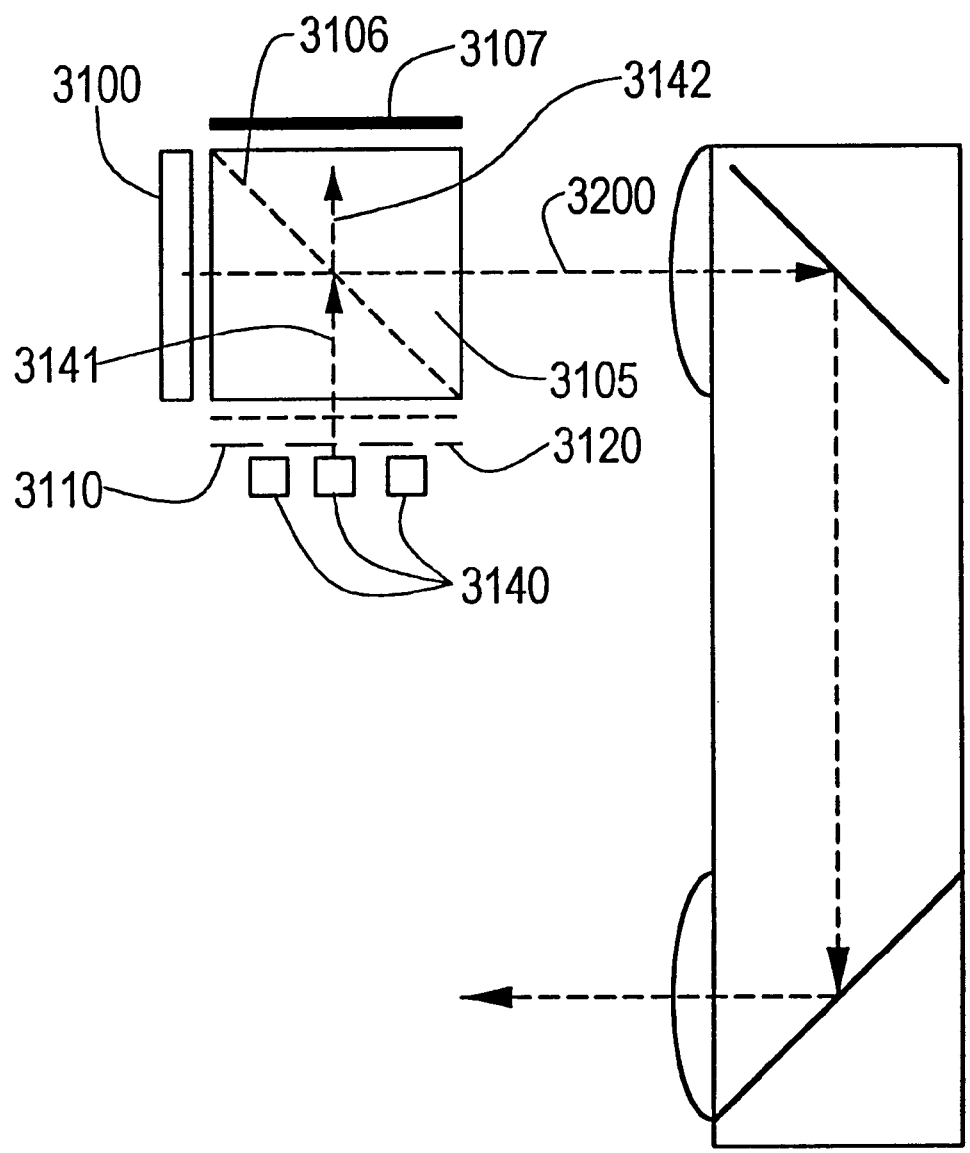
FIG. 45 is a still further embodiment having a reflective liquid crystal display and display illuminator.

This invention may be used with a reflective liquid crystal display, as shown in FIG. 45. A compact illuminator is formed from a polarization beam splitter cube 3105 or other polarization splitting optical element. LEDs 3140 or another illumination source provides light, represented for simplicity by single ray 3141, to the display by reflection from beam splitter interface 3106. This interface reflects one linear polarization and transmits the other, represented for simplicity by ray 3142, to a black surface 3107. The black surface absorbs the transmitted light. The reflected light further reflects from display 3100 which rotates the polarization of the bright pixels so that the interface 3106 acts as an analyzer in a manner well known in the art. Films may be used to improve the uniformity of the image. Film 3120 may comprise for example a linear polarizer designed to pre-absorb the undesired polarization to reduce reflections and improve contrast. Film 3110 may comprise a diffuser to improve the uniformity of the illumination. The display and illumination system produce an image which is viewed along the optical axis represented by ray 3200. While FIG. 45 shows the illuminator placed near the display, it may also be combined with various components of the viewing optics and may be placed in alternative locations.

The invention also includes methods for viewing a display with high magnification and high resolution. For cases in which the display is small and the degree of magnification large, additional optical surfaces may be introduced to magnify the image and reduce or eliminate distortions, by techniques that are well known in the art. This invention includes any number of lenses, mirrors, stops, and other optical surfaces arranged to provide magnification, focus adjustment, aberration control, and other features consistent with the foregoing specifications.

Alternative embodiments include various forms of eyepiece, illumination optics, and mounting fixtures. Two display devices operated in cooperation, one device in front of each of the two lenses of a pair of eyeglasses, can also be used if desired to provide a binocular display. The components may be formed from a variety of suitable materials. For example, the optical relay may be formed from glass or a plastic material such as polycarbonate resin, allyl diglycol carbonate monomer, polymethyl methacrylate, or epoxy resin.

The invention is not to be limited by what has been particularly shown and described, except as indicated by the appended claims.

What is claimed is:

1. An image display system for use with a user's eye, the image display system comprising:
   a support frame configured to be supported by the user's head;
   a display assembly supported by the support frame in front of an eye of the user comprising:
      a display element operative to provide an image separate from ambient light;
      an optical relay having two optical surfaces arranged to permit passage of ambient light through the two optical surfaces toward the user's eye;
      an optical pathway disposed internally within the optical relay to receive light from the display element, the optical pathway having at least a portion disposed along and between the two optical surfaces of the optical relay; and
      an eyepiece assembly disposed internally within the optical relay and comprising an interface disposed to redirect light, which has passed along at least the portion of the optical pathway, out of the optical relay to the user's eye.

2. The system of claim 1, wherein the eyepiece assembly comprises two materials having different indices of refraction, the two materials separated by the interface.

3. The system of claim 1, wherein the eyepiece assembly comprises a beam combiner.

4. The system of claim 3, wherein the beam combiner comprises a reversed beam splitter.

5. The system of claim 1, wherein the eyepiece assembly comprises a polarizing beam splitter.

6. The system of claim 1, wherein the interface is totally internally reflecting.

7. The system of claim 1, wherein the eyepiece assembly comprises a semi-transmitting mirror.

8. The system of claim 1, wherein the interface is planar.

9. The system of claim 1, wherein the interface is curved to provide a preselected optical power.

10. The system of claim 1, wherein the interface includes an interference coating to combine light paths.

11. The system of claim 1, wherein the eyepiece assembly comprises at least one reflecting surface disposed to redirect light toward the user's eye and a lens located before the user's eye.

12. The system of claim 1, wherein the support frame comprises an eyeglass frame.

13. The system of claim 12, wherein the display assembly is mounted to a temple of the eyeglass frame.

14. The system of claim 13, wherein the temple includes a plurality of mounting surfaces and the display assembly is mountable to one or more of the mounting surfaces.

15. The system of claim 14, wherein the mounting surfaces comprise openings in the temple.

16. The system of claim 12, wherein the optical relay is integrally formed within a lens supported in the eyeglass frame.

17. The system of claim 1, wherein the support frame comprises a face mask having a frame supporting a visor, and the display element is mounted to the frame.

18. The system of claim 17, wherein the optical relay extends between the visor and the user's eye.

19. The system of claim 17, wherein the face mask includes a second visor, a cavity defined between the visor and the second visor, the optical relay disposed within the cavity.

20. The system of claim 17, wherein the optical relay is integrally formed within the visor.

21. The system of claim 17, wherein the display assembly is adjustably mounted to the face mask.

22. The system of claim 21, wherein the display assembly is mounted with a rotatable and translatable adjustment mechanism.

23. The system of claim 17, wherein the display assembly is remountably attached to the face mask.

24. The system of claim 1, wherein the support frame comprises a head set.

25. The system of claim 24, wherein the head set includes a head frame and a padded portion configured to be worn on a user's head.

26. The system of claim 24, wherein the display assembly is mounted on a boom attached to the head frame of the head set.

27. The system of claim 26, wherein the boom is adjustably mounted to the head frame.

28. The system of claim 24, wherein the display assembly is mounted with a rotatable and translatable adjustment mechanism.

29. The system of claim 24, further comprising an ear cup mounted to the head set in a position to be worn adjacent a user's ear, and an audio transducer element is disposed in the ear cup.

30. The system of claim 24, further comprising a microphone mounted to the head set and located to pick up spoken sounds from the user.

31. The system of claim 30, wherein the microphone is mounted on a microphone boom mounted to the head set.

32. The system of claim 30, wherein the microphone is mounted adjacent to the display element.

33. The system of claim 30, wherein the microphone comprises a differential noise cancelling or phased array microphone.

34. The system of claim 1, wherein the display element comprises a transmissive or reflective active matrix liquid crystal display, an active matrix electroluminescent display, or a scanning display.

35. The system of claim 1, wherein the display element is disposed within a display housing.

36. The system of claim 1, wherein the display assembly is remountably attached to the support frame.

37. The system of claim 1 wherein the optical relay is formed from glass.

38. The system of claim 1 wherein the optical relay is formed from a plastic material such as polycarbonate resin, allyl diglycol carbonate monomer, polymethyl methacrylate, or epoxy resin.

39. The system of claim 1, wherein at least one of the optical surfaces of the optical relay is provided with a curvature preselected to correct the user's vision.

40. The image display system of claim 1, further comprising an audio transducer supported on the support frame.

41. The image display system of claim 40, wherein the display assembly further comprises a housing remountably attached to the support frame and the audio transducer is supported by the housing.

42. The image display system of claim 40, wherein the audio transducer is supported by the housing in acoustic communication with the ear.

43. The image display system of claim 1, further comprising a microphone supported on the support frame.

44. The image display system of claim 43, wherein the display assembly further comprises a housing remountably attached to the support frame and the microphone is supported by the housing.

45. The image display system of claim 1, further comprising an audio transducer and a microphone supported on the support frame.

46. An image display system for use with a user's eye, the image display system comprising:

a head-borne eyewear assembly comprising a support frame configured to be supported by the user's head and a lens system supported by the support frame in front of the eye of the user, the lens system comprising:

at least a first lens having two optical surfaces arranged to permit passage of some ambient light by the first lens through the two optical surfaces;

an optical pathway disposed internally within the first lens to receive light from a source separate from the ambient light, the optical pathway having at least a portion disposed along and between the two optical surfaces of the first lens; and an insert disposed internally within the first lens, the insert comprising an interface disposed to redirect light, which has passed along at least the portion of the optical pathway, out of the first lens to a user's eye; and a display assembly supported by the head-borne eyewear assembly comprising an image source operative to provide an image, and a further portion of the optical pathway disposed to direct light from the image source to the portion of the optical pathway disposed internally in the lens system.

47. The image display system of claim 46, wherein the display assembly further includes an illumination source.

48. The image display system of claim 46, wherein the display assembly further includes an optical or mechanical element to provide focusing.

49. The image display system of claim 46, wherein the display assembly further includes an optical element to provide a preselected optical power.

50. The image display system of claim 46, wherein the display assembly is supported by the support frame.

51. The image display system of claim 46, wherein the display assembly is detachably supported by the support frame.

52. The image display system of claim 46, wherein the support frame includes a temple and the display assembly is supported by the temple.

53. The image display system of claim 46, wherein the support frame includes a boom and the display assembly is supported by the boom.

54. The image display system of claim 46, wherein the display. assembly is supported by the lens system.

55. The image display system of claim 46, wherein the image source comprises a liquid crystal display, a flat panel active matrix electroluminescent display, a flat panel field emission display, a cathode ray tube, or an array of light emitting diodes.

* * * * *

UNITED STATES PATENT AND TRADEMARK OFFICE
CERTIFICATE OF CORRECTION

PATENT NO.    : 6,204,974 B1                                      Page 1 of 1
DATED         : March 20, 2001
INVENTOR(S)   : Mark B. Spitzer It is certified that error appears in the above-identified patent and that said Letters Patent is hereby corrected as shown below:

<u>Column 3,</u>
Line 57, "high" should read -- which --;

<u>Column 4,</u>
Lines 2 and 3, "is elements" should read -- elements --;

<u>Column 8,</u>
Line 51, "900" should read -- 90° --;

<u>Column 15,</u>
Line 65, "450" should read -- 45° --; and

<u>Column 16,</u>
Line 17, "14" should read -- 2014 --.

Signed and Sealed this

Twenty-seventh Day of August, 2002

*Attest:*

JAMES E. ROGAN
*Attesting Officer*        *Director of the United States Patent and Trademark Office*